G. J. BARRETT.
COMPUTING AND RECORDING MACHINE.
APPLICATION FILED SEPT. 22, 1915.

1,326,564.

Patented Dec. 30, 1919.
15 SHEETS—SHEET 1.

WITNESSES
Daniel Webster Jr.
William Conway.

INVENTOR
Glenn J. Barrett
BY Cyrus N. Anderson
ATTORNEY

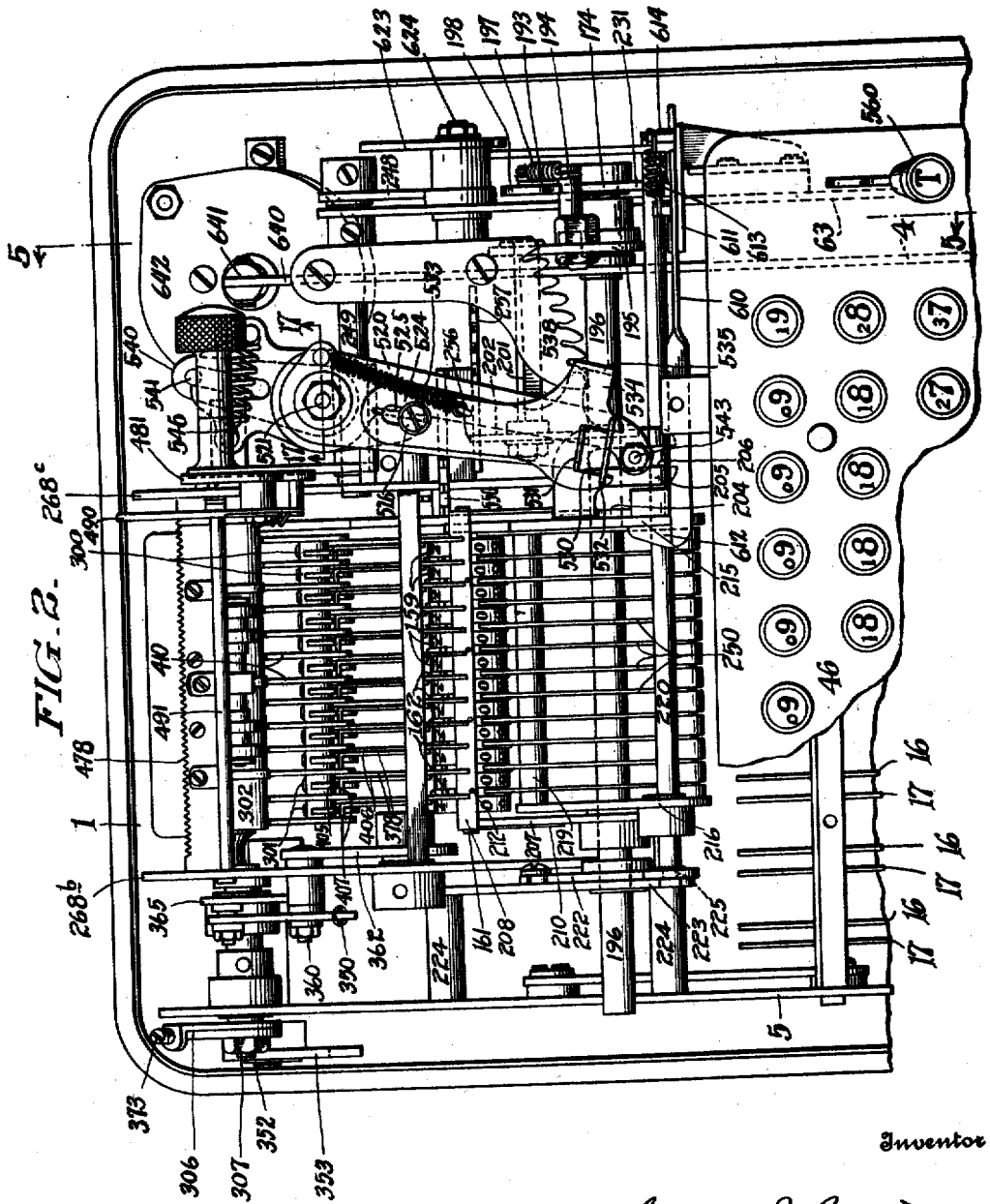

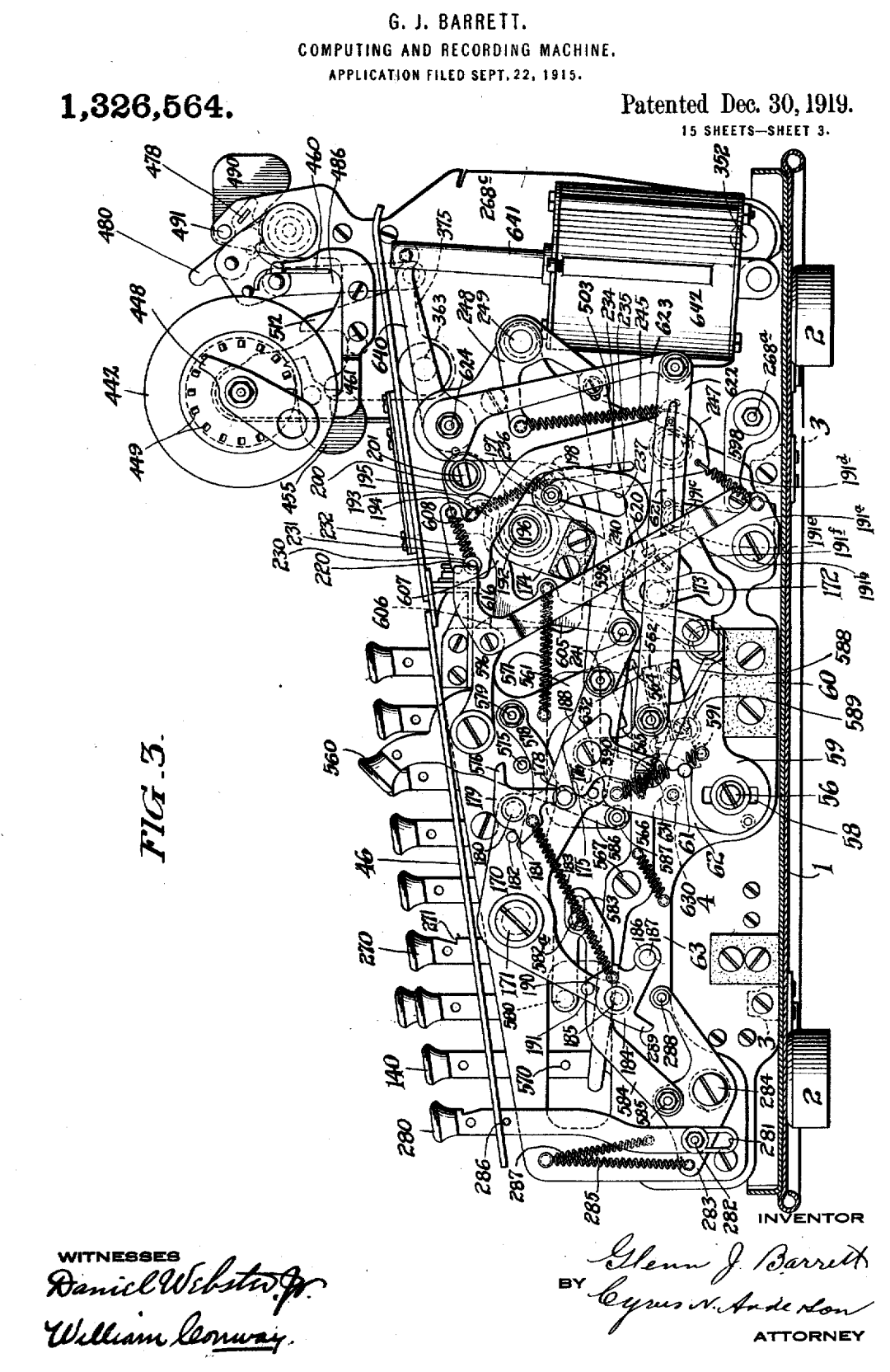

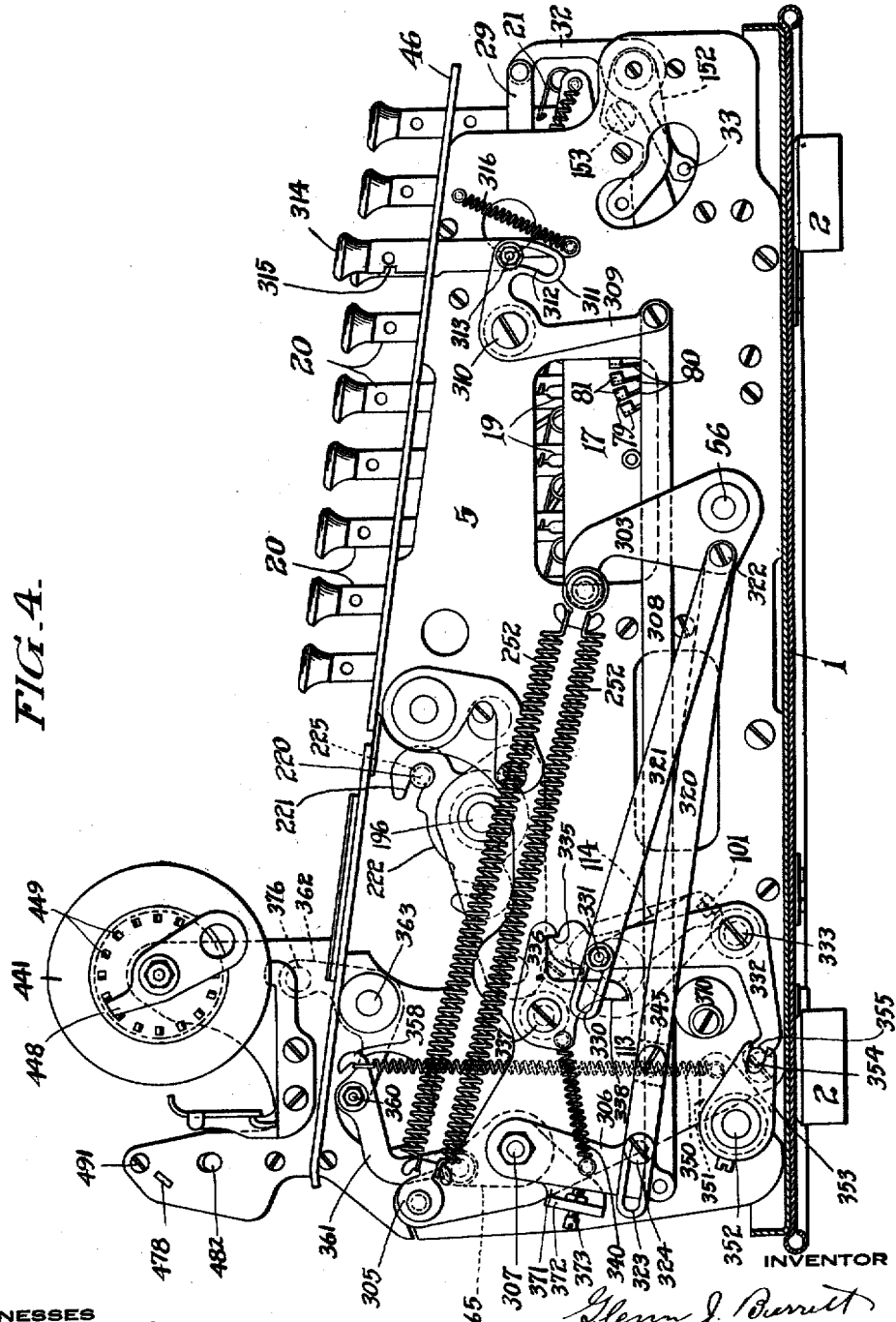

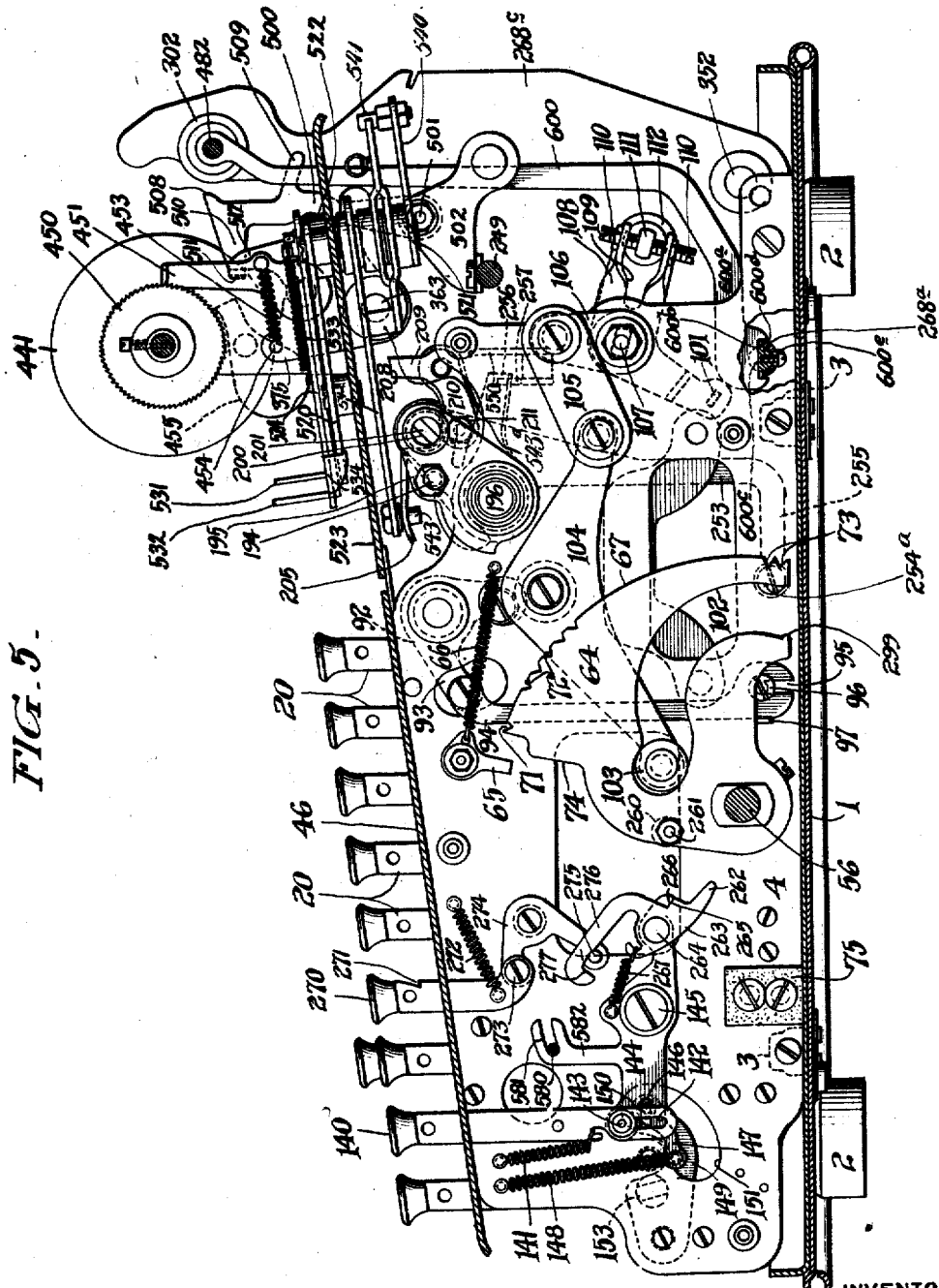

G. J. BARRETT.
COMPUTING AND RECORDING MACHINE.
APPLICATION FILED SEPT. 22, 1915.

1,326,564.

Patented Dec. 30, 1919.
15 SHEETS—SHEET 6.

WITNESSES
Daniel Webster Jr.
William Conway

INVENTOR
Glenn J. Barrett
Cyrus N. Anderson
ATTORNEY

G. J. BARRETT.
COMPUTING AND RECORDING MACHINE.
APPLICATION FILED SEPT. 22, 1915.

1,326,564.

Patented Dec. 30, 1919.
15 SHEETS—SHEET 7.

WITNESSES

INVENTOR

BY

ATTORNEY

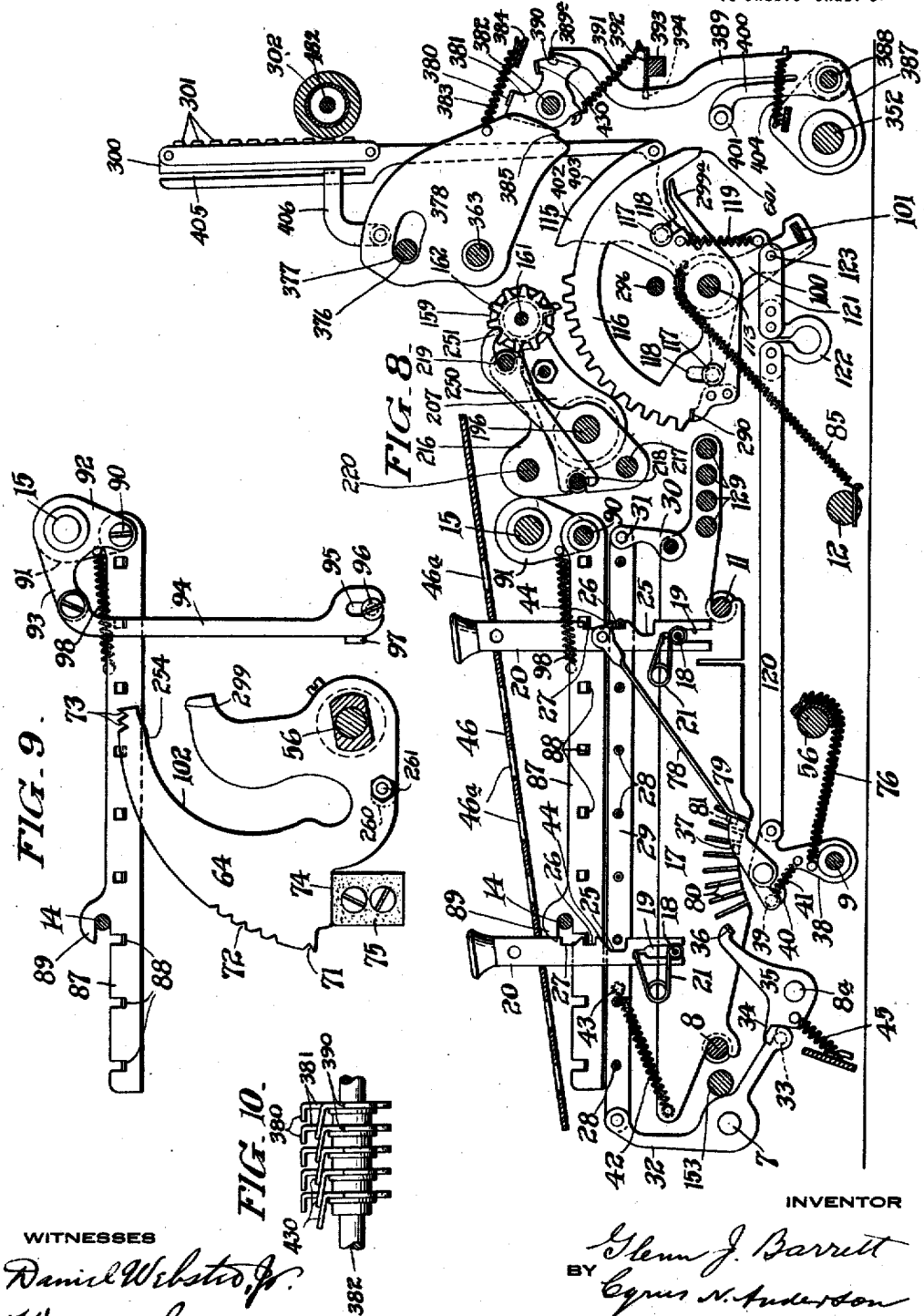

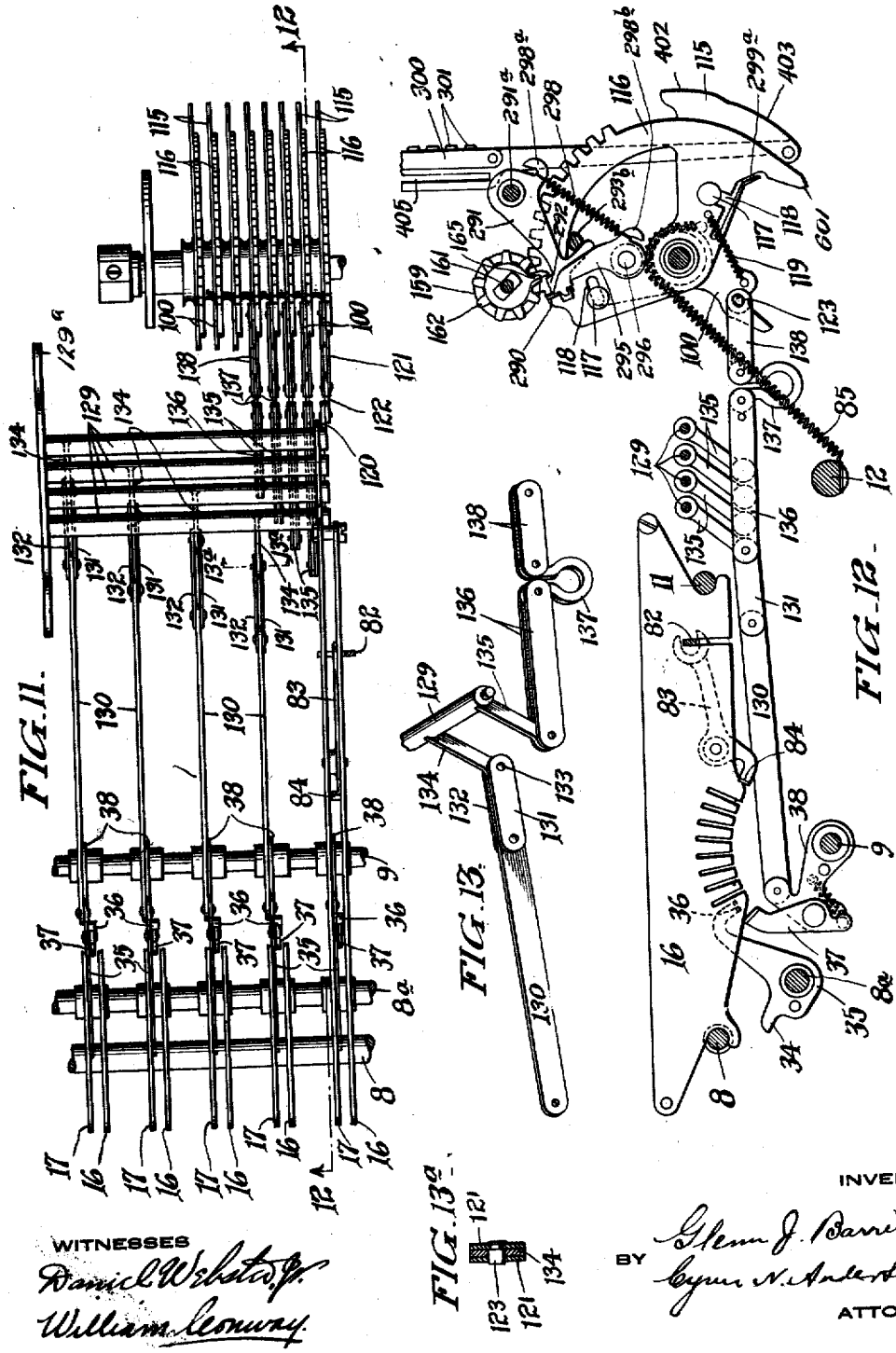

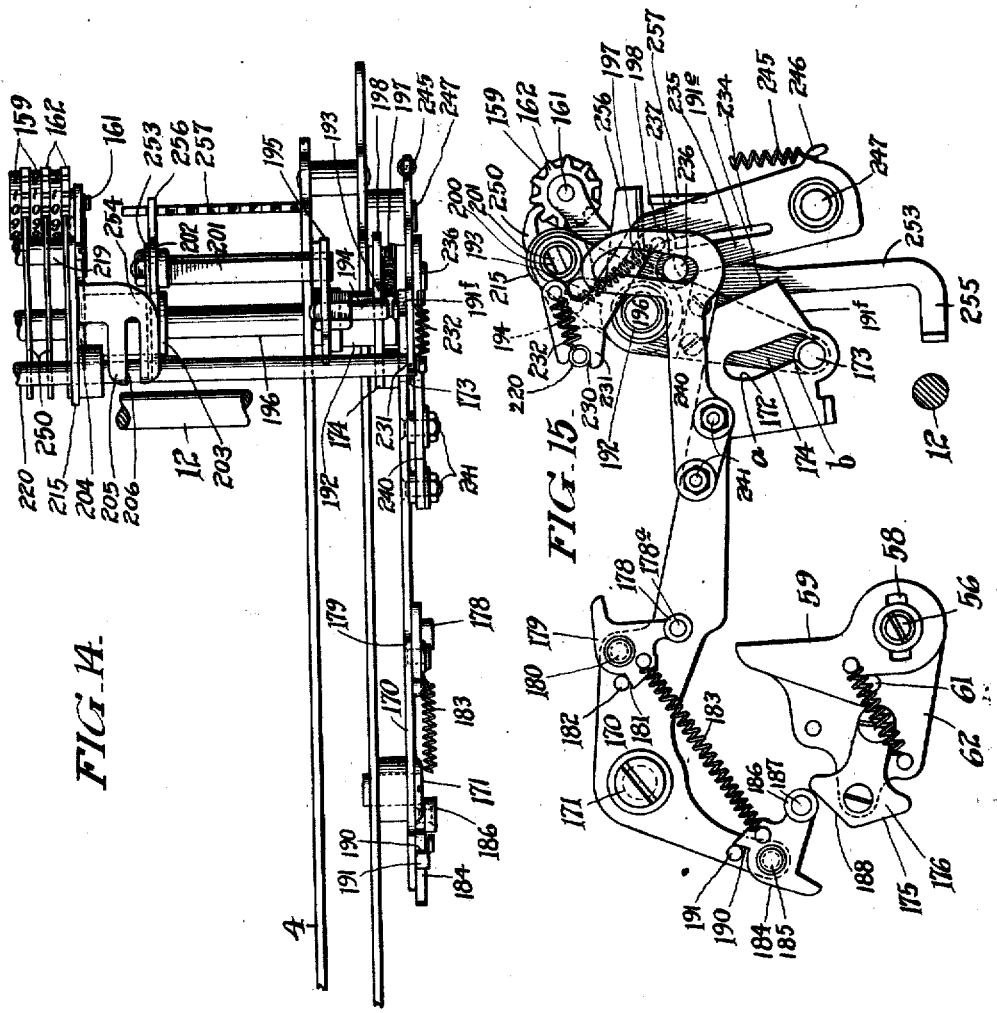

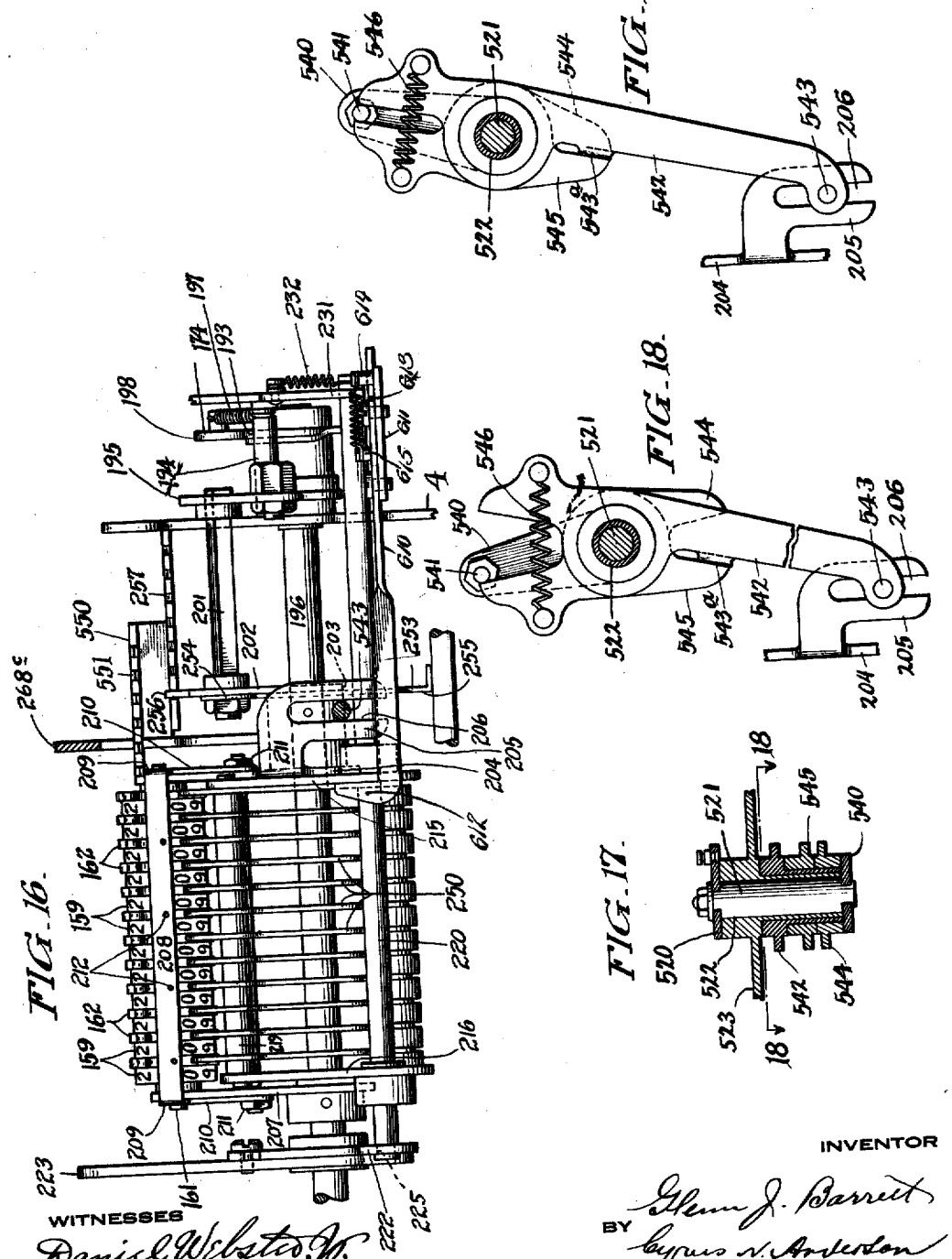

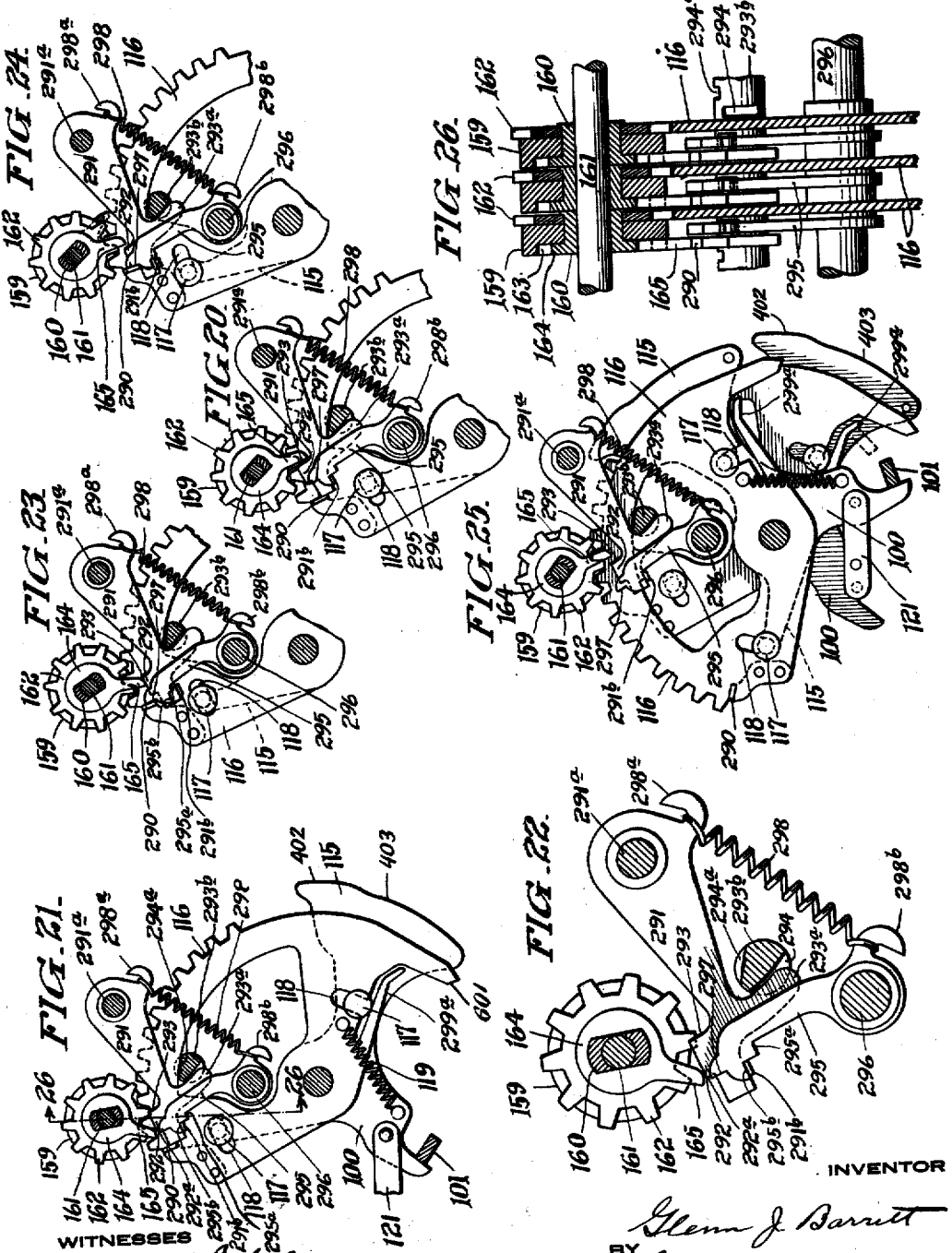

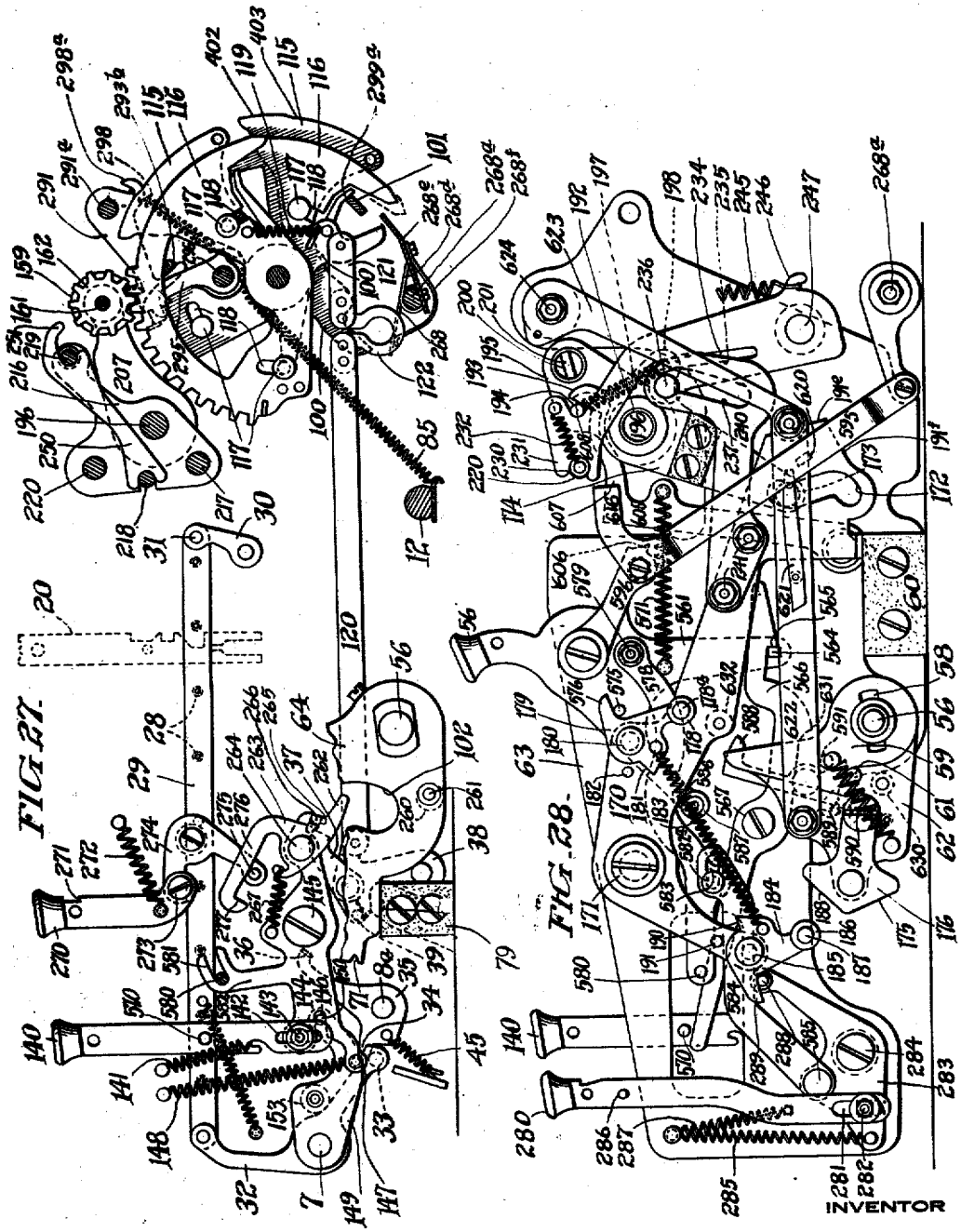

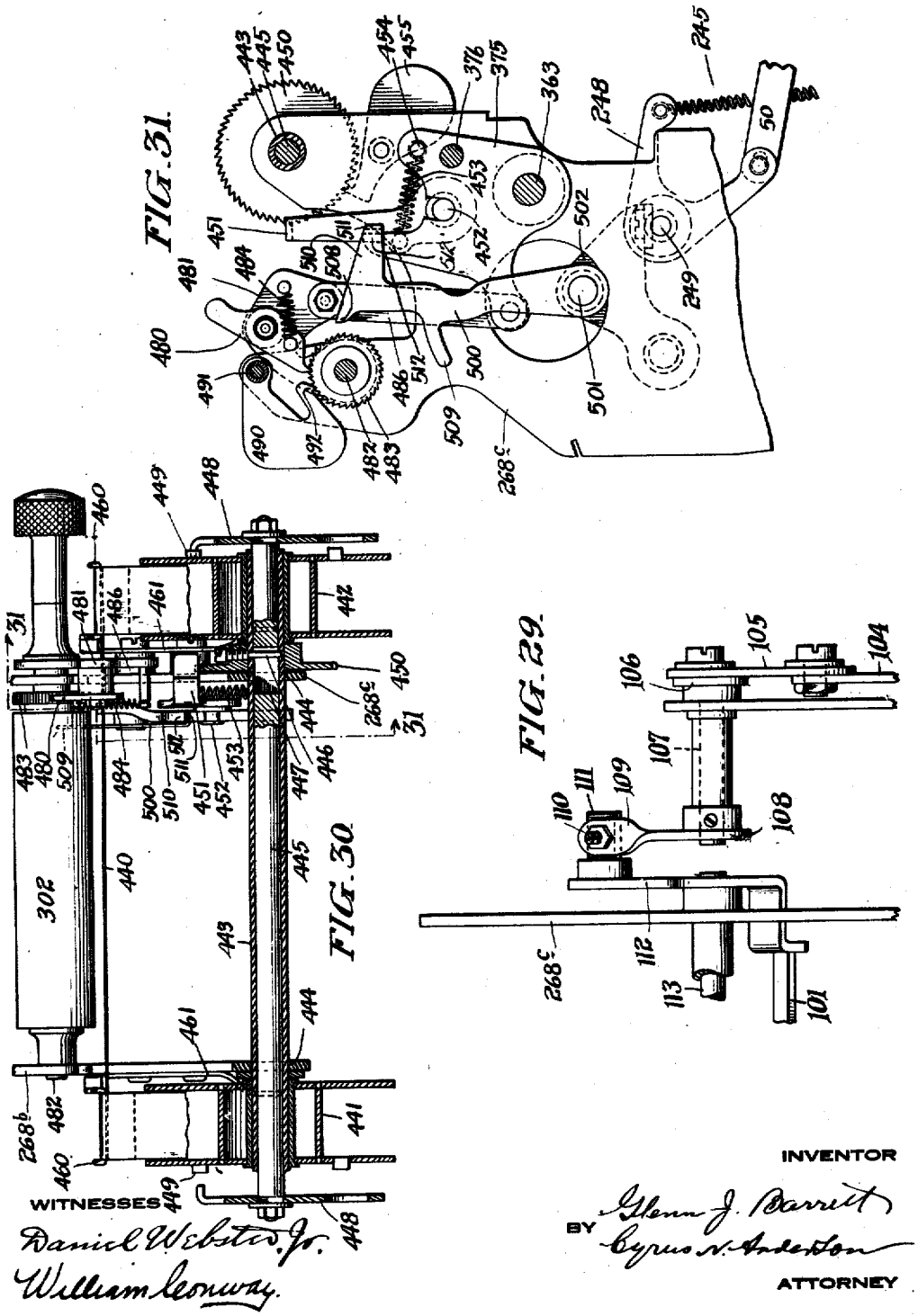

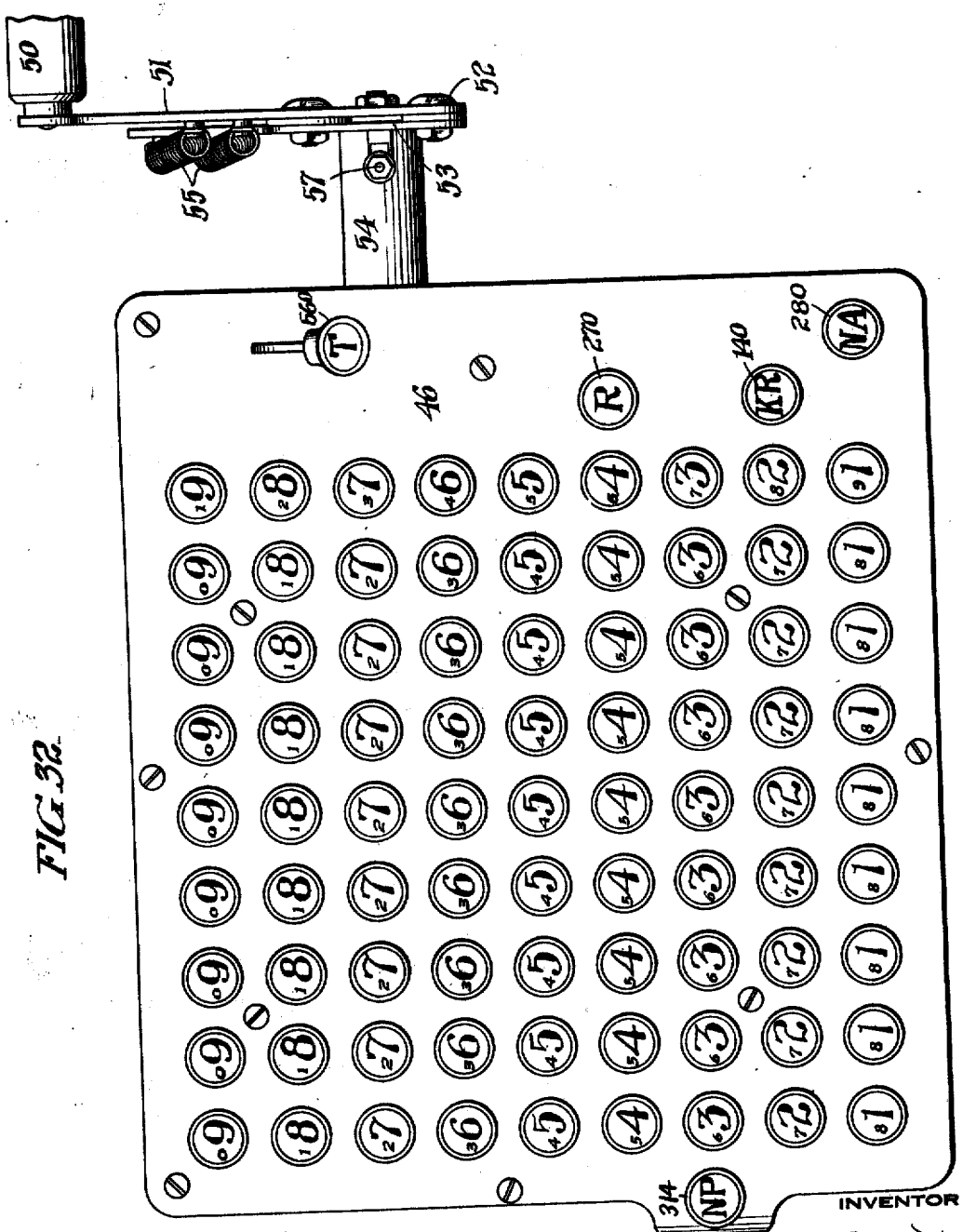

UNITED STATES PATENT OFFICE.

GLENN J. BARRETT, OF GRAND RAPIDS, MICHIGAN, ASSIGNOR TO BARRETT ADDING MACHINE COMPANY, OF PHILADELPHIA, PENNSYLVANIA, A CORPORATION OF DELAWARE.

COMPUTING AND RECORDING MACHINE.

1,326,564. Specification of Letters Patent. Patented Dec. 30, 1919.

Application filed September 22, 1915. Serial No. 51,985.

*To all whom it may concern:*

Be it known that I, GLENN J. BARRETT, a citizen of the United States, residing at Grand Rapids, Michigan, have invented certain new and useful Improvements in Computing and Recording Machines, of which the following is a specification.

My invention relates to improvements in computing and recording machines and among its objects are to provide a machine of small weight which is portable and which is convenient to operate and which has an extremely light and easy action; and it is also provided with means to effect visible printing and also with visible accumulating wheels, also referred to hereinafter as accumulators. A further object is to provide a machine in which the movements of the movable parts are governed without the use of an oil dash pot. It is also an object to provide an automatic multiplying and dividing means whereby the necessity of setting a member up more than once in the key-board is eliminated.

It is also an object of my invention to provide a machine constructed without the use of breakable castings thereby securing great strength and durability with a minimum of weight and bulk.

Many other objects and advantages of my invention will be hereinafter specifically referred to or will be apparent from the detailed description thereof which follows.

My machine belongs to the key set class. It is provided with a key-board having a key for each digit in each denominate column.

In the drawings herewith I have shown a key-board having keys arranged for nine denominations; an accumulator section having twelve accumulating wheels capable of accumulating a total or product of twelve digits; and a recording or listing mechanism including twelve type bars capable of recording numbers including as many as twelve digits.

*General operation.*—In operating the machine selected keys of the key-board are depressed and thereafter the operating handle is pulled toward the front of the machine and upon the completion of its forward stroke is returned to its normal position by the action of power springs embodied in the construction. As a result of the operation of the handle the members indicated upon the keys depressed are accumulated in the accumulators. A non-print key controls the action of the printing mechanism. Should such key be depressed the printing mechanism is prevented from operating to print the number or numbers accumulated in the accumulators. However, if the non-print key is not depressed the numbers accumulated in the accumulators will be simultaneously printed upon a strip of paper which is caused to travel through the printing mechanism of the machine. This machine, as are other machines of this character, is provided with mechanism whereby the total or product of the numbers previously accumulated in the accumulators may be printed or recorded by the printing mechanism. This is effected by the depression of a total key which so conditions certain mechanisms that upon the pulling forward of the operating handle the mechanism, including the printing mechanism, is actuated to print the total or product of the items accumulated in the accumulators. When a total is taken as thus described the accumulators are returned to zero position; that is, the machine is cleared, unless after having depressed the total key and after having started the operating handle upon its forward movement a "key-release" key is depressed. If such last mentioned key be depressed then the total or product of the accumulated items is returned into the accumulators. The total as thus taken and printed upon the strip passing through the printing mechanism is known as the sub-total.

The machine is provided with means for holding the keys of the key-board in depressed position after they have once been depressed but any and all keys may be released by the depression of the key-release key; also a depressed key in any one denominate column is released in case any other key in such column is depressed.

The machine is provided with a non-add key at the front right hand side of the key-board which when depressed during the return movement of the operating handle prevents the number which has been previously set up in the key-board from accumulating in the accumulators but the depression of such non-add key does not prevent the printing of such number as may have been set up upon the key-board. The machine is also provided with a repeat key which when depressed and held in depressed position causes the numbers set up in the key-board to be repeated each time that the operating handle is pulled forward. The non-add key, the key-release key, the repeat key and the total key are all situated upon the right hand side of the key-board while the non-print key is situated upon the left hand side thereof.

There are certain times when the mechanism of the machine is in such condition that if a total or a sub-total were taken the result would be incorrect; hence means is provided whereby the total key cannot be depressed for the purpose of taking a total except when the operating parts of the machine which are involved are in the proper position to produce or effect a correct result.

In the accompanying drawings to which reference should be made in order that my invention may be more readily understood I have illustrated certain forms of mechanism by means of which the various results accomplished by me are effected but it will be understood that changes in the details of construction may be made within the scope of the claims without departing from my invention.

In the drawings:—

Fig. 2 is a top plan view of the rear portion of the machine with a top plate and the ribbon mechanism removed so as to expose to view certain portions of the operating mechanism;

Fig. 3 is a view in elevation of the right hand side of the machine, the operating handle being omitted;

Fig. 4 is a view in elevation of the left hand side of the machine;

Fig. 5 is a longitudinal sectional view taken on the line 5—5 of Fig. 2, certain parts being omitted;

Fig. 8 is a view similar to Fig. 6 with a number of parts omitted in order that those remaining may be more clearly shown and the parts being in different positions from those in which they are shown in said Fig. 6;

Fig. 9 is a view showing a key stem locking bar and the means for supporting and operating the same;

Fig. 10 is a view in rear elevation of tripping levers for releasing type bar propelling members;

Fig. 11 is a top plan view of mechanism for operating gear sectors for controlling the accumulating wheels;

Fig. 12 is a longitudinal sectional view taken on the line 12—12 of Fig. 11 showing an accumulating wheel and a type bar and showing the means in side elevation for operating and controlling the same;

Fig. 13 is a perspective view of link connection which extends between a dial operating sector and a pivoted lever near the front of the machine;

Figure 1:
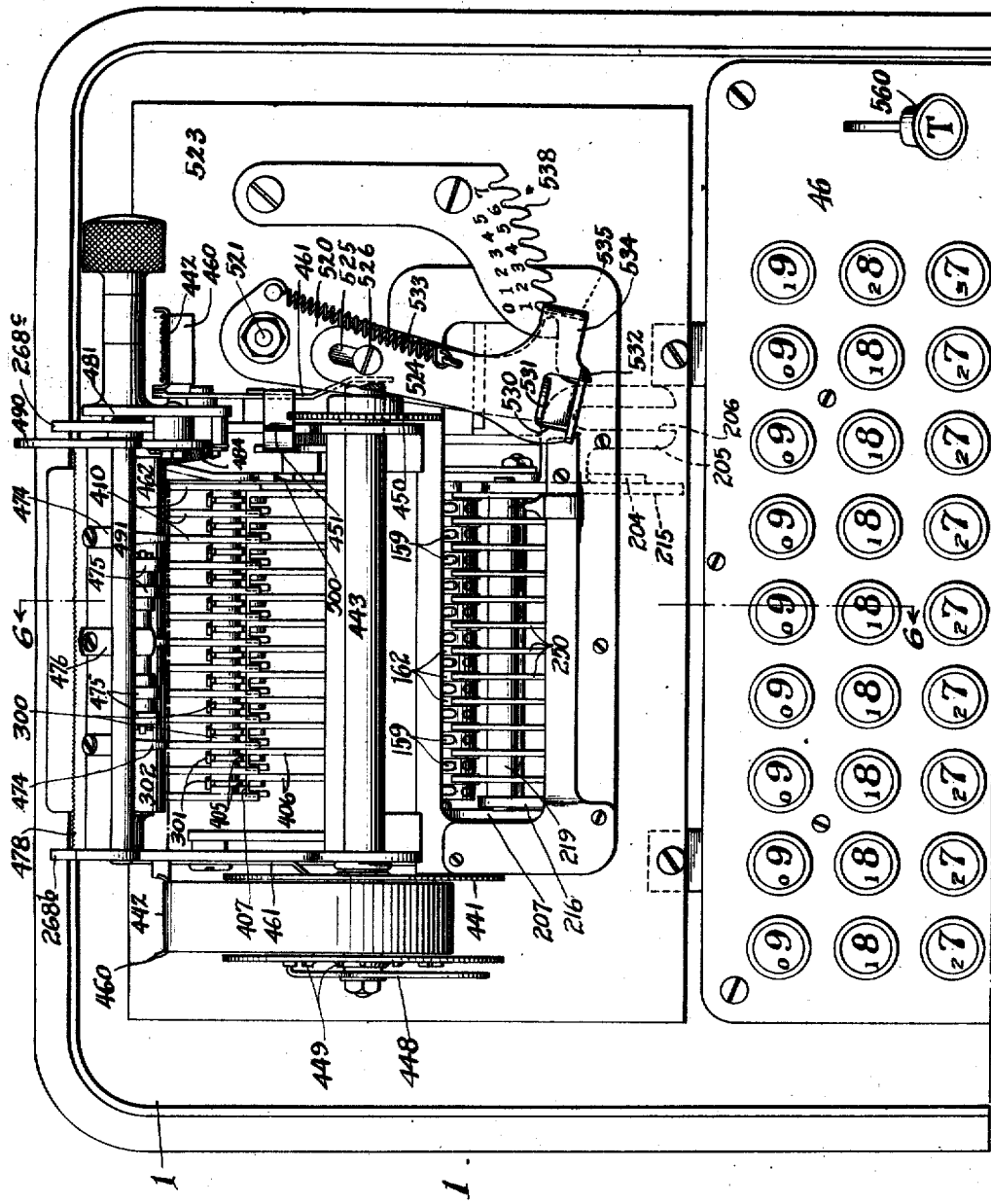
Figure 1 is a top plan view of the rear portion of a machine embodying my invention, the inclosing casing being omitted.

Fig. 13ª is a section taken on the line 13ª—13ª of Fig. 11;

Fig. 14 is top plan view of certain of the mechanism including a part of the accumulator supporting frame and the means for oscillating the same;

Fig. 15 is a view in side elevation of the mechanism shown in Fig. 14;

Fig. 16 is a top plan view of certain mechanism including the oscillatable and laterally shiftable accumulator frame;

Fig. 17 is a vertical sectional view taken on the line 17—17 of Fig. 2, the top plate, referred to in connection with the description of Fig. 2 as being removed, being shown;

Fig. 18 is a horizontal sectional view taken on the line 18—18 of Fig. 17;

Fig. 19 is a view similar to Fig. 18 with the parts in different relative position;

Fig. 20 is a longitudinal sectional view taken through the accumulator section in a plane adjacent to and upon the left side of the accumulator of a denominate column and looking toward the left and showing the parts in normal position;

Fig. 21 is a view similar to that shown in Fig. 20 but showing a holding trigger lever about to be tripped;

Fig. 22 is a view similar to that shown in Fig. 21 with certain of the parts omitted and those shown being enlarged.

Fig. 23 is a view similar to that shown in Fig. 21 but showing the trigger lever in the act of being depressed;

Fig. 24 is a view similar to that shown in the four preceding figures showing the parts in the position occupied just after a carrying movement has been effected;

Fig. 25 is a view similar to that shown in the five preceding figures but showing the parts in a still different position;

Fig. 26 is a transverse sectional view taken on the line 26—26 of Fig. 21;

Fig. 27 is a longitudinal sectional view showing the relation of the key-release key and the non-add key to other parts of the mechanism including a portion of the mechanism of the fifth denominate column;

Fig. 28 is an elevational view of the right hand side of the machine certain parts thereof being omitted so as to expose more clearly the parts which are shown;

Fig. 29 is a plan view in detail of the means for adjusting the universal bar which coöperates with the sector units for operating the accumulators.

Fig. 30 is a view partly in horizontal section and partly in top plan view showing parts of the ribbon and the printing mechanism;

Fig. 31 is a vertical sectional view taken on the line 31—31 of Fig. 30; and

Fig. 32 is a top plan view of the keyboard of the machine and also showing the operating handle.

In the drawings, 1 designates a stamped metal base having feet 2 upon which the same is supported. The base is provided with lugs 3 projecting upwardly therefrom adjacent to the opposite sides thereof which lugs are situated upon the inside of and in contact with the inner sides of the two side plates 4 and 5 of the machine. These plates are rigidly secured together by means of a number of transverse rods or bars including those numbered 6, 7, 8, 9, 10, 11, 12, 13, 14 and 15.

*The key-board and other mechanism.*—The key-board of the machine comprises nine rows of keys which rows extend longitudinally of the machine and each row includes nine keys. Each row together with the accumulating wheel and the interposed mechanism for actuating and controlling the latter may be referred to as denominate columns and each group of mechanism associated with each column may be further defined as a unit. Extending longitudinally of the machine is a series of narrow plates which are supported upon transverse rods or bars 8 and 11 intermediate the opposite side plates 4 and 5 of the machine. These narrow plates are arranged in couples, the plates in the respective couples being designated by the reference numbers 16 and 17. The plates 16 and 17 of each couple are situated relatively close to each other while the couples are separated from each other a relatively great distance. Interposed between the plates 16 and 17 of the respective couples are rollers 18 which engage in slots 19 in the lower ends of the keys 20. There are as many couples of these plates 16 and 17 as there are longitudinal rows of keys and the lower end of each key in each row extends between the plates of a couple and are guided thereby and by the rollers 18 which occupy the slots 19. The keys 20 are held normally in their uppermost positions as shown in Fig. 8 of the drawings by means of springs 21 one end of each of which is secured to a roller 18 and the other end of each of which is situated in the upper end of the slot 19. Each of the keys in each of the rows is provided with notches 25, 26 and 27 in the rear edge thereof, as shown in Fig. 8. The upper edge of the notch 25 is inclined upwardly and rearwardly as indicated and when a key is depressed is adapted to contact with one of the rollers 28 secured intermediate longitudinally extending bars 29. These bars are arranged in couples, there being a couple associated with each column or row of keys. The said bars are supported at their rear ends upon the upper ends of links 30 as shown at 31 and at their forward ends upon the upper ends of bell crank levers 32 which are pivoted upon the transverse rod 7. The lower arms of each of the said levers extend somewhat downwardly and rearwardly and each of them is provided with a laterally extending pin 33 which normally is in engagement with a forwardly extending projection 34 upon a lever 35. It will be understood that there are as many levers 32 and 35 as there are denominate units or columns. The levers 35 are pivotally supported upon a rod 8ª which extends between the sides 4 and 5 of the machine frame. The portion of each of the said levers 35 to the right of the said rod 8ª extends upwardly and rearwardly and terminates in a laterally extending projection 36 which serves as a stop for a stopping pawl 37 which is pivotally supported upon an arm 38 pivoted upon the cross rod or bar 9.

39 designates a pin which normally is held against a tail portion 40 of the arm 38 by the spring 41. It will be seen, therefore, that the pawl 37 is movable about its pivot toward the right so that when it is returning from the position in which it is shown, for instance, in Fig. 8 of the drawings, if it should meet or contact with an obstruction of any kind or character its movement toward the front of the machine would not be prevented but would be permitted to continue so that it might finally resume the normal position shown in Fig. 6 of the drawings.

It will be understood that there is a stopping pawl 37 and an arm 38 for each of the columns of keys and for each of the levers 35. Normally the bars 29 are held in forward position by means of springs 42 which are connected respectively with the forward ends of the plates 16 and 17 and with the said bars at 43. The tendency of the said bars 29 to move forward holds the bell crank levers 32 in position with the laterally extending pins or projections 33 pressing upwardly against the forwardly extending tail portions 34 of the stop levers 35 so that the laterally extending projections 36 of said levers are normally held in position in the path of travel of the upper ends of the stopping pawls 37 so that rearward movement of the said pawls is prevented except under certain conditions to be hereinafter referred to and described. As will be seen, however, even when the said lever 35 is in the position in which it is shown, for instance, in Figs. 6 and 8, the said stopping pawl 37 is permitted to have limited movement the purpose of which will be hereinafter described. Upon the depression of any key in a column the rearwardly and upwardly inclined upper edge of the notch 25 thereof contacts with a roller 28 situated between the bars 29 and cams the said bars rearwardly so as to cause a rearward movement of the upper end portion of the bell crank lever 32 connected to said bars and simultaneous downward and forward movement of the rearwardly extending arm of said lever so as to remove the lateral projection 33 thereof from contact with the forwardly extending tail 34 of the associated lever 35. Upon this occurrence the associated spring 45 contracts to cause pivotal movement of the said lever 35 so as to carry the lateral projection 36 thereof upwardly and somewhat forwardly out of the path of movement of the upper end of the coacting stopping pawl 37. When a key stem has been depressed a roller 28 occupies the notch 26 and the lower edge of said notch is pressed upwardly against the said roller by the action of the spring 21. Contact of the lower edge of the said notch 26 with the said roller prevents the return of the key to its normal position. It will be observed that the notch 26 is quite shallow as compared with the notch 25 so that when any key of a column has been depressed to bring a roller 28 into notch 26 the longitudinal bars 29 are held by the key in rearward position with the roller bearing against the bottom of said notch 26, being held in such position by the spring 42. If it should happen that a wrong key is depressed in any column it may be released merely by the depressing of any other key in the column. This is due to the fact that in depressing such keys the bars 29 are caused to move toward the rear a distance sufficient to carry a roller which may have been in engagement with the notch 26 to the rear of the rearwardly projecting portion 44 intermediate the notches 25 and 26. Upon this occurrence a spring 21 causes such previously depressed key to move upward immediately to its normal position.

In addition to the guiding means for the key stems, already referred to, it will be observed that they are also guided by the sides of holes or openings 46ᵃ in the top plate 46 of the machine.

The bell crank levers 32 are prevented from lateral movement by reason of the fact that the circular hub portions 32ᵃ thereof project into and operate within circular grooves 32ᵇ formed in the transverse rod or bar 6; also the stop levers 35 are held against lateral movement by reason of the fact that the circular hub portions thereof project into grooves 35ᵃ formed in a transversely extending rod 8ᵇ which extends between the sides 4 and 5 of the machine.

*Mechanism intermediate the keys and key actuated devices and the accumulating wheels and operation of the same.*—A key or keys having been depressed in any one or more of the columns the number or numbers indicated on such key or keys may be accumulated in the accumulators by pulling the operating handle 50 forward and releasing the same in known manner. Said handle 50 is of a construction substantially the same as that shown in Patent No. 1,130,463, issued March 2, 1915, except that the release lever 15 and parts connected thereto shown in said patent are omitted from the handle construction shown herein.

51 designates a member of the handle which is pivoted at 52 to a member 53 having a hub 54. The members 51 and 53 are held yieldingly in proper relation to each other by means of springs 55. These springs are adapted to yield under certain conditions when the handle is pulled forward so as to eliminate as far as possible any unnecessary strain upon the mechanism due to force applied through the handle, particularly when the forward movement of the portion 53 and the hub 54 thereof are stopped as will be hereinafter described. The hub 54 is provided with an opening whereby it is adapted to be placed in position upon the right hand end of the main driving shaft 56 of the machine. The said hub is retained in position upon the end of the driving shaft 56 by means of a spring-pressed locking pin 57 the inner end of which engages a circular groove adjacent to the end of said shaft.

The inner end of the said hub is provided with projections (not shown) which extend into correspondingly shaped openings 58 which are formed in opposite relation to each other in the operating member 59, the rear end of which is adapted to contact with a stop 60 when the handle returns to its normal rearmost position. When the handle is pulled forward the operating member 59 is pulled forward with it and by reason of the engagement of said member with a pin 61 which projects laterally from the arm 62 which is rigidly connected with the main driving shaft 56 the latter is rotated.

It may be noted that the operating member 59, the arm 62 and other levers, connecting links, etc. shown in Fig. 3 of the drawing are situated upon the outside of a plate 63 which is supported upon and spaced from the right hand plate 4 of the machine. Secured upon the said shaft 56 and situated between the plates 63 and 4 is an operating cam member 64. When forward rotation of the shaft 56 together with the parts connected therewith is once begun it must be continued until a complete forward stroke has been taken. This is rendered necessary by the pawl 65 which is pivoted to the right hand plate 4 of the machine and is held in the position shown in Fig. 5 of the drawings by means of a yielding spring 66. When the shaft 56 together with the cam 64 is rotated toward the left, that is toward the front of the machine, the outer curved edge 67 of the cam member 64 contacts with the swinging pawl 65 and swings it toward the left. Said pawl engages notches in the curved edge 67 of the cam 64 and prevents a return movement of the same until it has made a complete stroke or movement toward the left so that the lower end of the said pawl drops into position at the right hand edge of the said cam member. The said cam member, together with the shaft 56 and other parts connected thereto, may then return because the right hand edge of the said cam contacts with the left hand lower edge of the said swinging lever 65 to swing it toward the right, that is, toward the rear of the machine so that as the curved edge 67 rotates toward the right the lower end of the said swinging pawl 65 slides thereover. The outer curved edge of the cam member 64 is provided with a notch 71 in which the swinging end of the pawl 65 is adapted to engage almost immediately upon contact of the upper left hand corner of said cam member therewith whereby immediately after engagement of the cam member with the swinging pawl 65 said cam member is prevented from returning toward the right. The said pawl is also adapted to engage with the notches 72 in the curved edge of said cam member to prevent return movement. Also I have provided notches 73 in the extreme right hand end of the curved edge 67 so as to compel a complete disengagement of the swinging pawl 65 from the curved edge 67 before the cam member 64 can start on a return movement. Movement of the shaft 56 and the cam member 64 carried thereby toward the left is limited by the contact of the edge of the member 64 at 74 with the stop 75 secured to the side 4 of the machine.

Figure 6:
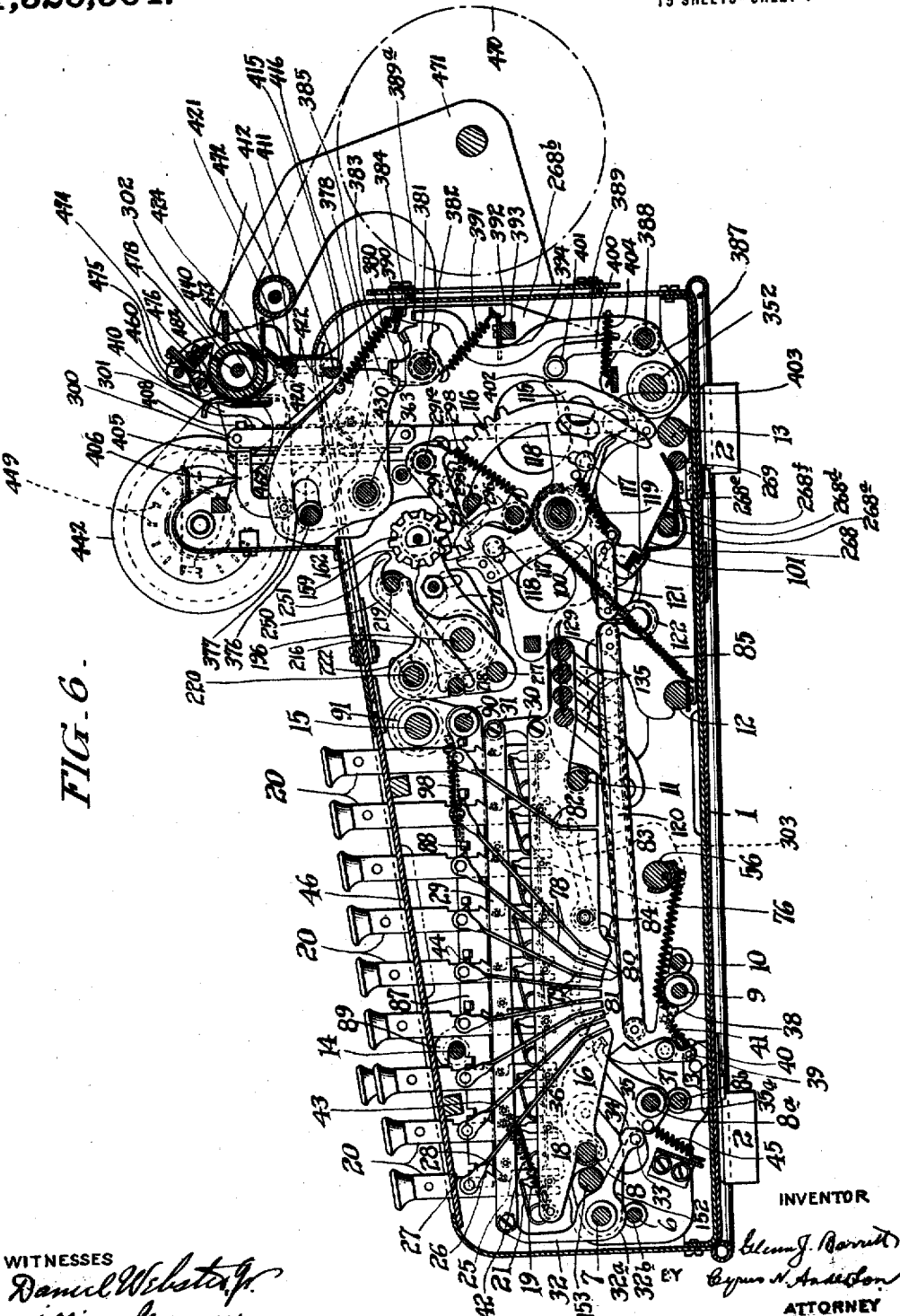
Fig. 6 is a longitudinal sectional view taken on a line 6—6 of Fig. 1 between the fourth and fifth denominate rows of keys and the parts associated with and operated thereby, certain of the parts exposed being shown in side elevation.

Coiled springs 76 are secured at their rear ends to the underneath side of the shaft 56 and at their forward ends to the arms 38 adjacent to their forward or underneath edges, as is shown in Fig. 6 of the drawings. When the parts are in normal position, as shown in Fig. 6, these springs extend partially around the shaft 9 so as to create a friction, which is harmless, between the said spring and the said shaft to prevent rebound of the parts. It will also be observed that as the shaft 56 is rotated toward the front the rear ends of the springs extend around the said shaft, as is shown in Fig. 8, with the same result as described in connection with the shaft 9. Furthermore, by connecting the springs of the shaft 56 in the manner shown the leverage of the said springs upon the said shaft tending to rotate the same is the same in all positions of the shaft. There is a spring 76 for each of the arms 38 connecting the latter to the shaft 56. It is clear that upon rotating the shaft 56 toward the front of the machine by means of the handle 51 the said springs tend to cause a movement of rotation of the arms 38 upon the shaft 9. Should no key in any one of the columns be depressed movement of the arms 38 under the influence of the springs 76 is limited by the contact of the upper end of the stopping pawls 37 with the stops 36 upon the levers 35. Each time that the handle is pulled forward to rotate the shaft 56 all of the arms 38 are moved through this limited distance. Such movement is sufficient to permit a carrying movement from a dial of lower to the dial of next higher denomination or order as will hereinafter be described.

The keys bearing the digit numbers 1 to 8 in each of the columns are provided with depending rods 78 the lower ends of which are provided, respectively, with lateral projections 79 which extend through radial slots 80 formed in portions of the lower edges of the plates 16 and 17. In extending through the said slots the lateral projections 79 extend across the space between the plates 16 and 17 constituting each couple of the series. The ends of the said lateral projections are bent at right angles as shown at 81 to provide means for holding the said lateral projections within the said radial slots 80. These right angular projections 81 rest against the left hand side of the plate 17 of each couple as is shown. These lateral projections or extensions 79 constitute stops which, when the keys are depressed, are moved into the path of movement of the stop pawl 37. It will be noted that both the stop pawls 37 and the upper rear ends of the levers 35 operate in the spaces between the respective couples of plates 16 and 17. In view of the fact that the 9 keys are situated a relatively great distance in rear of the slots for the 9 stops I have provided the 9 keys with pivoted depending rods 82 the lower ends of which are provided respectively with lateral projections similar to the lateral projections upon the depending rods 78 which projections engage the bifurcated rear ends of pivoted levers 83, there being a pivoted lever for each of the rows or columns of keys. The forward ends of these levers beyond their pivots depend so as to bring the laterally projecting stop portions 84 thereof into proper position to engage a stop pawl 37 when a 9 key in any column has been depressed. Normally the stops 84 are sufficiently far to the rear that they will not be engaged by the upper ends of the stop pawls 37 when the latter move to the rear as in the taking of a total or sub-total as will be hereinafter described. The position to which the stop 84 upon a lever 83 may be moved by the pivotal movement of said lever may be varied by bending or jacking said lever in rear of its pivotal support.

Assuming that a key, as for instance the 8 key as shown in Fig. 8 of the drawings, has been depressed, it will be observed that a stop 79 is thereby moved into position to limit or halt the rearward movement of the coöperating stop pawl 37 when the latter is moved to the rear under the propelling influence of the springs 76 and 85, the arrangement and operation of the latter being hereinafter described.

It is desirable that after a key or keys in a column or columns has or have been depressed and the handle has started on its movement toward the front of the machine it should be impossible to depress any other key or keys in any one of the denominate columns. In order to prevent the depression of a key under such circumstances I have provided locking bars 87, one for each of the rows or columns of keys. Each of these bars is provided with lateral projections 88 which projections are adapted at the first part of the forward movement of the handle 50 to move forward underneath the upper edge of the notches 26 in all of those keys which have not been depressed and which are in normal position. Such a projection 88 is shown within a notch 26 in Fig. 8 of the drawings underneath the upper edge thereof so that it is apparent that the said key cannot be depressed. The stop projection 88 associated with the depressed 8 digit key occupies the notch 27 (see Fig. 8) and occupies a position immediately underneath the upper edge thereof so that it also is prevented from being further depressed after the handle has started on its forward movement. The forward portions of the said bars 87 are provided with hook-shaped projections 89 which are hooked over the rod 14 as shown in Figs. 6 and 8, the said bars thereby having slidable engagement with the said rod. The rear ends of the said locking bars are supported upon a shaft 90 extending transversely between arms 91 and 92 which are rigidly connected with the shaft 15. The arm 92 is in fact a part of a bell crank lever the forward arm 93 of which is provided with a pivotally connected depending link 94 the lower end of which is slotted as indicated at 95 and is in engagement with a lug 96 which projects from the side plate 4 and which acts as a guide to retain the said link in proper vertical position. The said link 94 is provided adjacent to its lower end with a projection 97 which is situated underneath the rear lower edge of the cam 64. Spring 98 connected to the arm 91 and to the side plate 5 of the machine is always under tension tending to move the said arms together with the locking bars 87 having connection therewith forwardly into the position shown in Fig. 8. Normally the arms 91 are held in retracted or rear position by reason of the engagement of the lower edge of the cam 64 with the projection 97. Immediately the handle starts upon its forward movement the projection 97 is released so that the spring 98 causes pivotal movement of the arms 91 and a consequent forward movement of the locking bars 87 into locking position.

The arms 38 are connected by means of suitable connections with sector devices for operating the accumulating wheels. These sector devices may be regarded as units and each unit is provided with a depending tail or projection 100 with which the connections from the arms 38 are connected. It will be observed upon reference to Figs. 6 and 8 that the rear edges of the lower end portions of these depending projections or tails rest against a transversely extending bar, known as a universal bar, 101. It is apparent, therefore, that some means must be provided for causing movement of the said bar 101 out of contact with the said projections before the said arms 38, together with the parts connected therewith, can travel toward the rear. For the purpose of effecting rearward movement of the universal bar 101 out of engagement with the depending projections or tails 100 I have provided the cam member 64 with a cam slot 102 with which a roller 103 upon the forward end of the pivoted lever 104 is engaged. The rear swinging end of the said lever 104 is connected with a link 105 the rear end of which has connection with the upper end of an arm 106 which has rigid connection with a relatively short shaft 107 the inner end of which is provided with an arm 108. The rear end of this arm is bifurcated as is shown at 109, the bifurcated ends being provided with adjusting screws 110 as shown. Between the adjacent opposing ends of these adjusting screws is situated the end of a projecting stud 111 which is supported upon the rearwardly extending arm of a bell crank lever 112 which is rigidly connected with the end of a shaft 113 supported in axial alinement with the shaft 107. The forwardly and downwardly extending arm of the bell crank lever 112 is connected with and supports the right hand end of the universal bar 101 heretofore referred to. The left hand end of the said bar 101 is connected with and supported upon an arm 114 secured to the left hand end of the shaft 113. In the construction shown the said universal bar is integral with said arms. It is apparent, therefore, that upon a movement of rotation of the cam member or plate 64 the arm 106 is actuated so as to cause pivotal movement of the bell crank lever 112 and the arm 114 and of the shaft 113 to which they are secured. As the cam member 64 is moved toward the left the arm 106 is also moved toward the left, that is, toward the front of the machine, causing a constant rearward movement of the universal bar 101.

The sector units for causing rotation of the accumulating wheels are pivotally supported upon the shaft 113. These sector units respectively comprise the members 115 having the tails or projections 100 and the gear segments 116. The lever-like members 115 are each situated on the left hand side of a gear segment and are each provided with headed studs or projections 117 which project to the right through arcuate slots 118 in said segments. Springs 119 connect the gear segments 116 with the forwardly and downwardly extending projections 100 of the members 115. These springs being under tension are at all times tending to cause relative movement between the said members 115 and gear segments 116 so as to position the gear segments with relation to the member 115 with the headed studs 117 in engagement with the upper ends of the slots in the rear portions of the segments 116 and with the forward ends of the slots in the upper front portions of the said segments.

The connection between the arm 38 which is associated with the fifth row or column of keys and which is the connection shown in Figs. 6 and 8 of the drawings comprises the links 120 and 121 and the bowed or looped member 122 interposed between and connecting adjacent ends of the links 120 and 121. By adjustment of the looped member 122 the links 120 and 121 may be adjusted toward or from each other so as to shorten or lengthen the connection between the arm 38 and the depending projection or tail 100. The link 121 consists of two parallel elastic or resilient members which are permanently secured to the rear end of the loop 122 while their rear ends are detachably connected with the said projection 100 shown in Figs. 6 and 11. A rivet 123 is permanently secured to one of the said members of the link 121 and is adapted to extend through the projection 100 and through an opening in the opposing member of said link in which it is loosely fitted. It will be apparent, therefore, that by bending the parallel members of the link 121 so as to separate them the rear ends of the connection may be readily removed from the projection 100.

In order to avoid the strains and stresses incident to the construction involving what is known as the "reach over" connection between the arms 38 and the projections 100 upon opposite sides of the center of the machine, that is to say, upon opposite sides of the connection shown in Figs. 6 and 27 of the drawings, I have provided means whereby direct connection may be made between the projections 100 and the said levers 38. The necessity for some such construction arises from the fact that the projections 100 which constitute a part of the respective sector units are situated much closer together than are the arms 38. The means employed by me for the purpose stated comprises two series or groups of rock shafts each group including four shafts 129. The inner ends of these shafts terminate in opposing relation to each other upon opposite sides of the longitudinal central plane of the machine and are supported upon a central longitudinally extending plate. The outer ends are secured upon plates 129ª supported at the opposite sides of the machine upon the side plates 4 and 5. The group of these rock shafts together with the connections associated therewith which is situated upon the left hand side of the machine is shown in Fig. 11 of the drawings. The rock shafts together with the connections upon the opposite or right hand side of the machine are identical in construction and arrangement. Each of the connections between any arm 38, other than the central arm which is shown in Figs. 6 and 27, comprises a link 130 the rear inner end portion of which consists of the two parallel members 131 and 132. These members 131 and 132 are elastic or resilient and to the member 131 is secured a rivet 133 which projects through a hole in the lower end of an arm 134 and the end of which beyond the said arm extends into an opening in the member 132. The said arm 134 projects downwardly from one of the rock shafts. Said rock shaft is also provided with another downwardly depending arm 135 properly situated upon the said rock shaft so as to bring the same into alinement with the sector unit with which the connection in question is intended to be connected. To the arm 135 parallel links 136 are connected, the connection being made in substantially the same manner as described with respect to the connection between the parallel parts 131 and 132 and the arm 134. The rear ends of the links 136 are permanently connected with the forward end of a bowed or looped member 137 and the rear end of the latter is rigidly or permanently connected with the forward ends of two parallel links 138 which are are adapted to be connected with a projection or tail part 100 of one of the sectors to the right or to the left of the sector to which the connection shown in Fig. 6 of the drawings is connected. The connection between the links 138 and the projection 100 is made in substantially the same manner as is the connection between the links 121 and the projection 100 shown in said Figs. 6 and 11 and 27.

It will be seen, therefore, that by the construction shown I have provided means whereby connection between the arms 38 and the sector units is effected in a manner to eliminate all binding stresses and strains.

Upon the depression of the keys in any row or column of keys the bars 29 associated with such row or column are moved rearward and are held in rearward position as heretofore described. These bars being connected with the upper end of the bell crank lever 32 causes pivotal movement thereof so as to depress and hold depressed the lower rearwardly extended arm thereof which permits the spring 45 to cause pivotal movement of the lever 35 so as to carry the stop 36 upon the rear upper end thereof out of the path of movement of the stop pawl 37. With the parts just referred to in this position if the operating lever be pulled toward the front of the machine and assuming that the sector unit associated with the column, one of the keys of which is depressed, is free to rotate the springs 76 and 85 associated with the mechanism which taken collectively may be defined and described as a denomination unit, causes rearward movement of the arm 38, the connections between the same and the sector unit, as well as a pivotal movement of the said sector unit. Such movement continues until the stop pawl 37 contacts with the stop 79 or 84 having connection with the depressed key.

*Key-release mechanism.*—In case a key or keys has or have been incorrectly depressed it is desirable and necessary that there shall be means for conveniently and expeditiously releasing the same. For that purpose I have provided the key-release key 140 situated at the right hand side and near the front of the machine. The finger-piece or cap of said key bears the letters "K R". The said key is normally held in its uppermost position by means of a spring 141 having connection at its lower end with the key stem and at its upper end with a stud projecting from the plate 4. The lower end of the said key is provided with a slot 142 which is in engagement with a stud 143 upon the forward end of a release lever 144 which is pivoted intermediate its ends at 145 upon a stud projecting laterally from the plate 4. The forward end of the said release lever is provided with an open slot 146. The lower edge portion of the said lever at its forward end is extended to form an extension 147 to which the lower end of a spring 148 is connected the upper end of said spring having connection with a stud or other projection upon the plate 4. The forward end of the release lever 144 is held normally in its uppermost position by the tendency of the said spring 148 to contract. 149 designates a bail arm having an outwardly extending stud 150 which projects through an opening 151 in the side plate 4 of the machine and beyond the latter into the open slot 146 in the release lever 144. The bail arm 149 is pivoted upon the shaft 7. A similar but shorter arm 152 is pivotally secured to the opposite or left hand end of the shaft 7. A bail rod 153 is secured to and supported upon these arms. This bail rod normally is situated directly above the rearwardly extending arms of the bell crank levers 32. It follows, therefore, that upon the depression of the key-release key 140 the bail arms 149 and 152 and the bail rod 153 are depressed causing a corresponding depression of the rearwardly extending arms of each and all of the bell crank levers 32. Such movement of these levers causes a rearward movement of the several couples of parallel bars or links 29 so as to carry the rollers 28 to the rear to thereby permit any key which may have been depressed to move upwardly under the influence of its spring 21.

*Accumulating wheels and controlling mechanism therefor.*—The accumulating wheels or accumulators 159 are secured respectively upon sleeves 160 which are rotatably supported upon a shaft 161. Associated with each wheel is a gear wheel 162 also secured upon the said sleeve 160. Each gear is situated upon the right hand side of the wheel with which it is associated. The wheels are of disk shape and are provided with recesses 163 within which are seated flanges 164 formed upon the sleeves 160. The opposite ends of the sleeves are upset against the respective gear wheels 162 so that the said gear wheels and the accumulator wheels are secured permanently together so that there can be no relative movement between a gear and its associated wheel or accumulator. The flange 164 of each sleeve is provided with a projection 165 which projects outwardly through an opening formed in the flange-like portion of the wheel which surrounds the recess 163. Each of said projections constitutes a trigger the purpose of which will be hereinafter described. Normally the wheels are in their lowermost position with the gears 162 in engagement with the gear segments 116. It is apparent, therefore, that before the sector units which include the gear segments 116 are caused to rotate by pulling the operating handle forward after the depression of one or more keys in the key-board the gears 162 should be disengaged from the said gear segments. To accomplish this I have provided mechanism including a cam lever 170 which is pivoted at 171 to a stud upon the plate 63. The rear end portion of the said cam lever is provided with a cam slot 172 with which a stud 173 projecting laterally from the lower end of a swinging arm 174 engages. To take care of any lost motion between the arm 174 and the cam lever 170 I have provided a clip adjustably secured to the said lever 170 in operative relation to the cam slot 172. Normally the said cam lever 170 occupies the position shown in Fig. 3 with the stud 173 in the upper end of the cam slot 172. Upon the upward swinging movement of the rear end portion of said lever 170 the lower end of the arm 174 is caused to move rearwardly by the rearward movement of the stud 173 in the rearwardly inclined portion of the cam slot 172. At its lower end the cam slot is extended slightly forwardly and downwardly such lower end portion being concentric with the axis of movement of the cam lever 170 so that during the latter portion of the upward movement of the rear portion of the cam lever the arm 174 remains stationary. Initial upward movement of the rear portion of the cam lever 170 is caused by the contact of the edge 175 of the cam device 176 carried upon the arm 62. Said inclined edge 175 contacts with a roller 178 upon a stud 178ª upon the lower end of the swinging arm 179 which arm is pivoted at 180 upon the cam lever 170. The said arm is provided with a shoulder 181 which normally is in contact with a lug 182 upon the said cam lever 170 being held in such position by means of a coiled spring 183 one end of which is connected to the swinging arm below its point of pivotal connection 180 and being connected at its opposite end with a similar swinging arm 184 pivotally connected at 185 to the forward end of the cam lever 170. The swinging arm 184 is provided with a roller 186 secured upon a stud 187 at its its lower end with which both the edge 175 and the edge 188 of the angular cam member 176 are adapted to contact. The cam edge 175 contacts with the roller 178 on the stud 178ª immediately upon the starting forward of the operating handle 51. As before described, when the handle is pulled forward the arm 62 is also carried forward. By reason of the fact that the arm 179 is prevented from turning upon its pivot toward the left the cam arm 170 is compelled to move in order to permit the passage of the angular cam member 176 underneath the said roller. Hence it will be seen that the rear end portion of the said cam member is lifted by a forward movement of the cam member 176. The inclined cam edge 175 also contacts with the roller 186 upon the stud 187 but in view of the fact that the arm 184 upon which said roller is carried is free to rotate toward the left, that is, toward the front of the machine, the said cam edge 175 slides past the said roller 186.

Immediately upon the start toward the rear of the arm 62 and the cam member 176 carried thereby the cam edge 188 contacts with the roller 186 and owing to the fact that the arm 184 is normally held against movement toward the right by reason of the engagement of a shoulder 190 thereon with a stud 191 upon the forward end portion of the cam lever 170 it is necessary that the said arm 184 and the forward portion of the cam lever 170 shall move upwardly in order to permit the return movement of the said arm 62 and angular cam member 176. Such movement of the cam arm actuates the arm 174 heretofore referred to.

An arm 191ª pivoted at 191ᵇ to the plate 63 adjacent to the rear end of the cam lever 170 is provided at its upper end with a roller 191ᶜ which is held by means of a spring 191ᵈ against either of the beveled edges 191ᵉ or 191ᶠ, depending upon whether the rear end of the cam lever 170 is in depressed or elevated position. When in depressed position the roller contacts with the beveled edge 191ᵉ and tends to hold the rear end of said lever in depressed position and resists upward movement of said rear end until after the roller 191ᶜ passes below the angle between the edges 191ᵉ and 191ᶠ. Thereafter the pressure of the roller against the beveled edge 191ᶠ assists in causing a rapid or quick upward movement of the rear end of said lever. As the lever is returned to the depressed position shown in Fig. 3 of the drawings the reverse action takes place. The roller contacting with the beveled edge 191ᶠ resists downward movement of the rear end of the lever until the angle between the beveled edges passes beyond the said roller 191ᶜ. Thereafter the said roller acting upon the edge 191ᵉ assists in causing an accelerated downward movement of the rear end of said lever.

The arm 174 is supported upon a hollow stud 192 projecting laterally from the plate 63. The upper end of the arm 174 is provided with an upwardly extending projection 193 which normally is held in contact with an eccentric stud 194 which extends laterally from an arm 195 which is loosely and pivotally supported upon a shaft 196. A spring 197 having connection with a rearwardly extending projection 198 at the upper end of the said arm 174 and with the said eccentric stud 194 holds the said projection 193 and the stud 194 in yielding contact with each other. This is a very important feature of construction as hereinafter appears. The upper end of the arm 195 is provided with an oblong or rectangular shaped opening 200 through which a similarly shaped projection 201 projecting laterally from an arm 202 extends. The arm 202 is rigidly secured to a sleeve 203 which in turn is fixedly secured to the rotatable and slidable shaft 196. To the opposite end of the said sleeve an arm 204 is also rigidly or fixedly secured said arm being provided with a projection 205 having a slot 206 therein as shown in Fig. 16 for a purpose to be hereinafter described. An arm 207 is also fixedly or rigidly secured to the shaft 196 near the left hand side of the accumulator wheel section of the machine. The shaft 161 upon which the accumulating wheels, etc. are supported is supported upon the outer rear ends of the arms 204 and 207.

208 designates a bar or plate which is situated above the wheels and which is provided with depending portions 209 having openings through which the opposite ends of the wheel shaft 161 extend. These depending portions 209 are secured in position upon the opposite ends of said shaft by suitable washers or otherwise. The depending portions 209 are provided with forward extensions 210 which are situated in contact with the outer sides of the arms 204 and 207 and are secured thereto by means of nuts and bolts 211. Upon the said bar are provided means at intervals as shown at 212 for indicating the decimal and other divisional points between the wheels; that is to say, the first one of the said indicating points upon the right hand of said bar is situated between the second and third wheels. It will be apparent that as the arm 174 is shifted or oscillated back and forth from front to rear the arm 195 is also correspondingly oscillated and by reason of the connection between the said arm 195 and the arms 202, 204 and 207 the latter three are also shifted or oscillated to cause oscillating movement of the accumulator wheel shaft 161 which is carried upon the outer ends of the arms 204 and 207.

When the gears 162 are not in engagement with the gear segments 116 it is desirable that means be provided for preventing accidental rotation of the said dials.

*Accumulator-locking mechanism.* — The means provided for locking the accumulators comprises arms 215 and 216 which are pivoted upon the shaft 196 and which are situated directly inside of and in contact with the hubs of the arms 204 and 207. These arms 215 and 216 are connected together by means of the rods or bars 217, 218 and 219. The said arms also have slidable engagement with a rod 220 which extends transversely of the machine and is supported at its left hand end in a slot 221 opening toward the rear in the upper end of a supporting plate 222 adjustably secured upon a plate 223 which is supported upon studs 224 projecting inwardly from the side plate 5 of the machine. The left hand end of the rod 220 is provided with a circular groove 225 which engages the plate 222 whereby axial movement of the said rod 220 is prevented.

The right hand end of the rod 220 is situated in a seat 230 provided in the forward edge of the upper end portion of an arm 231. The right hand end of said rod is held normally in said seat by means of a spring 232 one end of which is connected to the said rod and the other end of which is connected to a point upon the upper end of said arm 231 a distance from and to the rear of said rod. The said arm 231 is slotted as indicated at 234 to provide an adjustable part 235 having a roller 236 which works in a cam slot 237 in the rear oblong shaped end of a rearwardly projecting member 240 which is secured by means of nuts and screw bolts 241 to the cam lever 170. The said member 240 being rigidly secured to the rear end portion of the oscillating cam lever 170 is necessarily caused to oscillate in a vertical plane therewith. Such vertical oscillation by reason of the engagement of the roller 236 with the cam slot 237 occasions oscillatory movement of the upright arm 231, the said upright arm being held normally in a forward position by the action of a spring 245 having connection at its lower end with a hook 246 upon the rear edge of the said arm in rear of its pivotal connection at 247 to the plate 63. The other end of said spring 245 is connected to a forwardly projecting arm of a bell crank lever 248 rigidly secured to a rock shaft 249.

250 designates a series of twelve locking plates which are supported upon the rods 218 and 219 of the accumulator locking frame. The rear ends of these locking plates are shaped to form rearwardly and downwardly extending more or less pointed portions 251 which are adapted to extend into the spaces between the gear teeth upon the accumulator gears 162. It is apparent when these projecting ends 251 are in engagement with the gears 162 the latter are held against rotation. Normally the locking frame and the locking plates carried thereby are in the position shown in Fig. 6 of the drawings in which the locking projections or extensions of the plates are not in engagement with the gears 162. Immediately, however, that the operating handle is started toward the front of the machine the rear end of the cam plate 170 starts on its upward movement as has been described carrying with it the arm 240. The cam 237 is so shaped that the arm 231 is immediately moved to the rear and by reason of the connection of the spring 232 to the rod 220 the latter is moved toward the rear. Said rod extends through the side arms 215 and 216 of the accumulator locking frame above the pivot rod 196 on which they are supported and causes a rearward and downward movement of said frame whereby the projections or extensions 251 upon the locking plates are moved into engagement with the accumulator gears 162. This is the first relative movement between the accumulators and the accumulator locking frame which is effected. The cam slot 172 in the cam actuating lever 170 for the accumulators is so shaped that immediately after the locking plates have moved into engagement with the gears 162 the said accumulators, through the mechanism heretofore described, are moved upwardly. The bottom portion of the slot 102 is so shaped and related to the axis of rotation of the cam plate 64 that during the first or initial part of the forward movement of the latter no movement of the universal bar 101 is effected thereby allowing time for the last two preceding movements referred to before there is any movement of the gear segments to rotate the accumulators. Immediately that the handle bar starts upon its return movement under the influence of the power springs 252 the said cam slot 172 causes an immediate and quick return of the accumulator frame with the accumulators carried thereby into normal position with the gears 162 in engagement with the gear segments 116. The cam slot 237 is so shaped that the arm 231 simultaneously moves toward the rear so as to permit the accumulator locking frame with the locking plates thereof in engagement with the teeth of the gears 162 to return with the said accumulator. Immediately, however, that the said accumulator gears 162 have engaged with the gear segments 116 the said accumulator locking frame together with the locking plates thereof are moved out of engagement with the gear teeth of the said accumulator gear. As previously stated, these last described movements are effected at the beginning of the return movement of the operating handle and parts associated with and controlled thereby.

In order to limit the downward movement of the accumulator carrying frame I have provided a bar 253 which is secured at its upper end to the inner end of the part 201 adjacent to and upon the inside of the arm 202. Said bar 253 is provided with a bearing seat 254 which is seated upon the sleeve connecting the arms 202 and 204. The lower end of the said bar 253 is extended forwardly as shown at 255 and is adapted to contact with the transverse bar 12. When the accumulator carrying frame is in its lowermost or depressed position a projection 256 extending rearwardly from the arm 202 engages in the notches of a plate 257 so that lateral movement or displacement of the accumulator frame and the accumulators carried thereby is prevented at such time.

If the projection 256 should happen to contact with the portions of said plate 257 between the notches no harm will result because the springs 197 will yield to permit separation of the projection 193 from the stud 194.

As heretofore described, if it happens that a key in any row of the keys shall have been depressed the sector unit corresponding to such row is permitted to rotate to carry the gear segment 116 forwardly, such rotation being effected during the time that the accumulator frame is in elevated position with the accumulator gears 162 out of engagement with the said gear segment.

The extent of forward rotation of the sector units including the gear segments 116 depends upon the key which may have been depressed in a column. For instance, if a key bearing a digit 8 shall have been depressed, as is shown in Fig. 8 of the drawings, so as to move a stop 79 connected with said key into the path of travel of the stop pawl 37, the sector unit corresponding and coöperating with such key will rotate through a greater arc or distance than if a key bearing a digit 3 had been depressed. These gear segments when the operating handle is released do not begin their return movement until after the gears of the accumulators have engaged with the gear segments 116. This is due to the fact that the outer end portion 254 of the cam slot 102 in the cam plate 64 through a distance of about 12 degrees is concentric with the pivotal axis of said cam plate whereby during the first part of the return movement of the said cam plate the actuating lever 104 remains stationary so that the universal bar 101 remains stationary and permits the sector units, including the gear segment 116, to remain stationary. During this period the cam slots in the cam lever 170 through intermediate mechanism heretofore described effect a downward movement of the accumulator frame to cause the accumulator gears 162 to engage the gear segments 116 and to cause the disengagement of the locking plates of the accumulator locking frame from the said gears 162. Continued rearward movement of the cam plate 64 causes movement of the lever 104 to effect forward movement of the downwardly and forwardly depending arm of the bell crank lever 112 to return the universal bar 101 to its normal position shown in Fig. 6. By reason of the contact of the said universal bar with the projections or tails 100 of the plates 115 (constituting a part of the sector unit) such of the said sector units as have been permitted to rotate toward the rear of the machine as heretofore described are returned to their normal position shown in Fig. 6.

It may be here noted that during the latter part of the return of the operating handle and the parts actuated thereby to normal position after the forward stroke of the said handle has been completed and the handle released the keys of the respective rows or columns which may have been depressed are automatically released and permitted to return to normal position. Such releasing of the keys is effected by means of a roller 260 mounted on an eccentric stud 261 upon the main cam plate 64. The roller 260 being supported upon the eccentric stud 261 may be adjusted as desired. Said roller upon the forward movement of the cam plate 64 contacts with the upper side of the lower end portion 262 of a swinging lever 263 pivotally mounted at 264 upon the rear end of the key release lever 144. The lower end portion of the said lever 263 is free to swing toward the front of the machine so that the said roller 260 slides over the same without affecting the key release lever 144. Normally the lever 263 is in the position shown in Fig. 5 of the drawings with a shoulder 265 thereof in engagement with a shoulder 266 formed upon the rear end of the lever 144, being held in such position by means of a coiled spring 267. Upon the return movement of the cam plate 64 the roller 260 contacts with the under forward side of the lower end portion 262 of the lever 263 and lifts the same. Such lifting action, by reason of the contact of the shoulders 265 and 266, causes an upward movement of the rear end portion and a downward movement of the front end portion of the lever 144. Such movement of the lever 144 actuates the bail frame including the rod 153 to depress the rearwardly extending arms of the bell crank levers 32 to cause a rearward movement of the vertical arms thereof and a consequent rearward movement of the bars 29 to release any and all keys which may be depressed. Such movement takes place prior to the time that rearward movement of the locking bars 87 is effected so that such keys as may have been depressed and which are released move upwardly only a portion of the distance through which they have been depressed. Such depressed keys having been released first move upwardly until the lower rearwardly inclined edges of the notches 27 contact with the stop projections 88.

The roller 260 first contacts with the under side of the lower end portion 262 of the swinging lever 263 when the cam plate 64 has returned through about one-third of the distance of its return movement but such keys as may have been depressed are not actually released until the said cam plate has moved through substantially two-thirds of the distance of its return movement.

It should be noted here that in the operation of the machine whenever the operating handle is pulled forward the stop pawls 37 associated with the key rows or columns in which no key has been depressed move forward until they contact with the stops 36 upon the levers 35. Such limited movement causes relative movement between the plates or arms 115 and the gear segments 116 so as to engage the studs 117 with the ends of the arcuate slots 118 in said segments opposite to the ends in which they are shown as being situated or engaged in Fig. 6 of the drawings. When a bail rod 153 is depressed by the action of the roller 260 upon the swinging lever 263, as heretofore described, so as to carry the pins 33 upon the outer ends of the rearwardly extending arms of the bell crank levers 32 out of engagement with the forwardly extending projections 34 upon the levers 35, the springs 45 tend to cause pivotal movement of the pivoted levers 35 to disengage the stops 36 from the stop pawls 37. Such movement is prevented, however, by the friction between the said stop pawls and the said stops 36 so that movement of the sector units at such times is prevented.

Just before the completion of its returning forward movement the universal bar contacts with the projections or tails 100 of all of the plates 115 which have been moved through the limited movement just described and return the same to normal position.

It may be stated here that normally, that is to say, during the operation of the machine for accumulating items or numbers in the accumulators, the forward movements of the sector units are accomplished when the accumulator gears 162 are not in engagement with the said segments 116 as described. When a key in a denominate column has been depressed the stop 79 associated therewith which is moved into position permits forward rotation of the sector unit to an extent such that upon its return movement after an accumulator gear has returned into engagement therewith, as has been described, rotation of the accumulator corresponding with the column in which the key has been depressed is effected through a distance equal to the number of units in the digit of the key depressed. If a 9 key be depressed the accumulator will be rotated through a distance of nine spaces or if a key bearing an 8 digit be depressed the corresponding accumulator will be rotated through eight spaces or units of distance. It will be seen, therefore, that the number indicated upon a depressed key is accumulated or added into the corresponding accumulator.

There being no keys in the key-board corresponding to the three accumulators and the sector units associated therewith at the left hand side of the machine and consequently no means such as the stops 36 and stop pawls 37 for holding the sector units thereof against rotation when the operating handle is pulled forward, it is necessary to provide special means for that purpose.

The means provided consists of a plate 268 which is pivotally supported upon a pivoted rod 268ª supported by the side plate 4 and the two intermediate parallel upright plates 268ᵇ and 268ᶜ. The rear edge of said plate 268 is provided with a projection 268ᵈ which normally contacts with the upper side of a plate 268ᵉ which is riveted to the pivoted rod 268ª. In order to hold the projection 268ᵈ normally in contact with the upper side of the plate 268ᵉ I have provided a spring 268ᶠ the forward end of which contacts with the under side of the forward edge of the said pivoted plate 268. The forward edge of the plate 268 constitutes a stop to limit the rearward movement of the tails or projections 100 of the sectors associated with the three dials at the left side of the machine. The said projections of these sector units move forward at each operation of the machine and engage with the forward edge of the said stop plate 268. Such stop plate serves the same function as the stopping means 36 and 37 hereinbefore referred to. The purpose of pivotally supporting the stop plate 268 is to permit the return of one or more of the projections 100 associated with the three left hand sector units to normal position after the printing of a sub-total as will hereinafter be described. The underside of the rear edge portion of the said plate 268ᵉ is adapted to contact with a rod 269 which extends between and is supported upon the two intermediate plates 268ᵇ and 268ᶜ.

*Repeating mechanism.*—At times it is desirable and necessary to repeat a number, that is, to successively accumulate the same in the accumulators and successively record or list the same. In such case a repeat key 270 may be depressed which key may be held in depressed position by reason of the engagement of the notch 271 therein with the under side of the top plate 46 of the machine. The said key normally is held in its uppermost or elevated position by means of a coiled spring 272 having connection therewith. The lower end of the said key is pivotally connected at 273 to the upper and forwardly extending arm of a bell crank lever 274 the lower and downwardly extending arm of which is provided with a pin 275 which contacts with the under side of an upwardly and forwardly projecting arm 276 of the swinging lever 263. The lug 275 is prevented from becoming disengaged from the arm 276 by means of a hook-like projection 277 upon the forward end thereof. Upon the depression of the key 270 the bell crank lever 274 causes rearward movement of the arm 276 and simultaneous forward movement of the lever 263 so as to carry the same into such position that it cannot be engaged by the roller 260 upon the cam plate 64. It is apparent that when the lever 263 is in the position last described there is no means actuated by any of the moving parts to release the keys in the denominate columns and as the depression of the said repeat key 270 does not in any manner affect the actuation and operation of the cam plate 64 and the accumulator actuating cam lever 170 the accumulators, accumulator locking frame and the sector units are actuated and operated just as they usually are when the keys in the denominate columns are depressed.

*Non-adding mechanism.*—In order to prevent the accumulation into the accumulators of numbers or items corresponding to the keys which may have been depressed I have provided a non-adding mechanism comprising a non-add key 280 having a slot 281 in its lower end with which is engaged a stud 282 adjacent to the forward end of a swinging lever 283 pivoted at 284 to the forward end of the plate 63. Normally the stud 282 is held in the upper end of the slot 281, as shown, by means of a spring 285 one end of which is connected with the forward end of the said lever 283 and the other end of which is connected to the upper forward edge portion of the plate 63. The key 280 normally is held in its uppermost or elevated position with a stop 286 in contact with the under side of the plate 46 by means of a coiled spring 287 shown in Fig. 3. Upon the depression of the said key the rear end portion of the lever 283 is elevated so as to cause a pin 288 carried upon the outer end thereof to contact with a projection 289 upon the swinging lever 184 to cause a swinging movement of the latter so as to carry the roller 185 thereof forwardly into such position that it is out of the line of movement of the angular cam member 176. As already described the first action of the said cam member or plate 176 upon the cam lever 170 is to cause an upward movement thereof. As has been described the downward movement of the said cam lever is effected by engagement of the said angular cam member 176 with the roller 186 upon the return movement of the former. It will be apparent, therefore, that if the swinging lever 184 is moved into position so that the roller 186 carried thereby is out of the line or path of movement of the said angular cam member 176 the said cam lever cannot be caused thereby to move in a downward direction. Consequently the said cam lever remains in the elevated position to which it is first moved with the accumulator frame in its raised position with the gears 162 thereof out of engagement with the gear segments 116 so that rotation of the latter would not cause a corresponding rotation of the accumulator wheel; hence no number would be accumulated in the accumulator wheels.

*Transfer mechanism.*—In machines of the character to which my invention relates means whereby a carrying operation from an accumulator of lower to an accumulator of higher denomination or order may be effected or accomplished is necessary. For instance, if the 9 digit key in the unit column be depressed a couple of times and the machine operated after each depression it is apparent that in accumulating and indicating the sum 18 thereof in the accumulators a carrying operation from the accumulator of the units column to the accumulator of the tens column will be necessary.

As has been already described, normally the gear segment 116 is in engagement with the accumulator gears 162. Also the springs 119 connecting the gear segments 116 with the arms 115 tend to cause relative movement of the same, the tendency being to move the gear segments toward the rear. It is a relative movement between these parts when permitted at the proper time and under proper conditions which effects a carrying movement of the accumulator in the denomination next above that of the lower denomination from which the carrying operation takes effect.

The gear segments 116 are provided respectively with laterally extending projections 290 which are adapted to engage the forward ends of stop levers 291 which are pivoted upon a rod 291$^a$ which extends between the parallel upright plates 268$^b$ and 268$^c$. The stop arms 291 are adapted to be depressed so as to disengage the forward ends thereof from the stops 290 by means of the tripping projections 165 which contact with the upper edges of the projecting portions 292 upon the forward upper edges of the said stop arms 291. One of the said projections 165 is shown in Fig. 23 of the drawings as being in engagement with a projection 292, the arm 291 having been already depressed thereby so as to release the stop 290 and permit rearward swinging movement of the gear segment 116 provided other parts of the mechanism are in condition to permit such movement. The projections 292 provide shoulders 292$^a$ adjacent to the forward ends of the said arms 291 which limit the rearward swinging movements of the gear segments 116 when the stops 290 thereof have been disengaged. The rear edges of said projections 292 also constitute shoulders 293 which act as stops to limit rotation of the accumulators toward the rear, that is, in the direction of the hands of a watch, having reference to the illustrations of these parts as shown in the drawings.

In Fig. 20 the projection 165 is shown in normal position immediately to the right of the projection 292 in which position the accumulator with which the said projection 165 is associated is in zero position.

For the purpose of guiding the stop arms 291 as they are moved about their pivot 291$^a$ I have provided the guiding projections 293$^a$ which work in slots 294 formed in the forward under side of a rod 293$^b$. The upper side of said rod 293$^b$ is also slotted as indicated at 294$^a$ and serves as a guide to prevent lateral deflection of the gear segments 116. In case it should happen that after a stop arm 291 is depressed so as to disengage the forward end thereof from a stop 290 of a gear segment and such gear segment is held against or prevented from swinging toward the rear means is necessary to hold the said stop in depressed position until after such gear segment is released to permit such rearward swinging movement. The means employed by me for that purpose consists of catch arms 295 pivotally supported upon a pivot rod 296 extending transversely of and supported upon the parallel intermediate side plates 268$^b$ and 268$^c$. The forward edge portions of the said catch arms are provided with shoulders 295$^a$ and 295$^b$ which are adapted to engage projections 291$^b$ extending toward the right from the lower front edge portions of the stop arms 291.

When the parts are in normal position as shown, for instance, in Fig. 20, the projection 291$^b$ is in engagement with the shoulder 295$^b$. These latter shoulders limit the upward swinging movement of the stop arms 291 and hold them in such position that the stop projections 290 on the gear segments 116 will contact therewith. The projections 165 are of such length that when one of them contacts with a projection 292 upon a stop arm it depresses the forward end thereof a distance to permit the catch arm 295 to swing forward to carry the shoulder 295$^a$ over the projection 291$^b$. Hence the said arm 291 will be held in its depressed position until a gear segment 116 swings to the rear so that the stop projection 290 contacts with the upper end of the catch arm 295 at 297 to push the same to the rear and thereby disengage the shoulder 295$^a$ from the projection 291$^b$. The coiled spring 298 is connected with hooks 298$^a$ and 298$^b$ upon the stop arm 291 and upon the stop catch 295 and by reason of its tension tends to swing the arm 291 upwardly and the stop catch 295 forwardly.

When, in operating the machine, the operating handle is pulled forward the connections between the levers 38 and the sector units move rearward in all of the columns or column units until they are stopped by reason of the contact of the stop pawls 37 with the stops 36. Of course, in the column in which a key has been depressed the stop pawls 37 move rearward until they engage a stop having connection with the depressed key. The movement of the connections rearwardly to the extent just described in those columns in which no key has been depressed is sufficient to permit and cause movement of the arms or plates 115 a distance sufficient to carry the headed studs 117 from the position shown in Fig. 21 of the drawings to positions in the other or opposite ends of the slots 118 in the gear segments 116. It is apparent, therefore, that no carrying movement of a gear segment can be effected until the universal bar 101 has reached almost the end of its return movement where it contacts with and picks up the projections 100 of the plates or arms 115 and returns them to the normal position shown in Fig. 6 of the drawings. As this pick up movement occurs the carrying springs 119 are permitted to cause rearward pivotal or swinging movement of the gear segments 116 to cause a movement of the gear which has been released through a one-step movement so as to acccumulate a unit in the column of next higher denomination than that in which the digit key was depressed.

It also may happen that a stop arm 291 is released to permit a carrying movement from lower to a higher denomination at a time when the gear segment of such higher denomination is in a forward position with the projection 290 thereof out of contact or engagement with the forward end of a stop arm 291. In such case it is necessary that the stop arm 291 shall be held in depressed position until the gear segment of such higher denomination has traveled rearwardly to carry the stop projection 290 thereon above the upper edge of the forward portion of such stop arm. Such stop projection will engage the upper end of the catch arm 295 and move it rearwardly as described.

Assuming that a carrying operation has been effected as described the gear segment will remain in position with the stop projection 290 overlying the upper edge of the forward end portion of the arm 291 until the operating handle has been pulled forward to operate the machine. The pulling forward of the handle and of the parts connected therewith causes a rearward movement of the connections between the arm 38 and the projections or tails 101 of the arms 115 through a limited distance as heretofore described. In view of the fact that the carrying spring of the sector unit in which the carrying operation has been effected has caused such relative movement between the gear segment 116 and the arm or plate 115 that the headed studs 117 occupy positions in engagement with the ends of the slots 118 opposite to that of the positions in which they are shown in Figs. 6 and 21 such movement of the said plate 115 necessarily occasions a corresponding movement of the gear segment 116 thereby returning it to normal position. The operation of returning the gear segment to such normal position is frequently referred to as a "resetting" operation.

In order to insure that the gear segments shall be moved through a distance sufficient to make certain that the forward end of the arm 291 will move upwardly in front of the stop projection 290 I have provided upon the inner side of the cam slot at its outer end a projection 299 which contacts with the roller 103 upon the completion of the forward movement of the cam plate 64 so as to cause an extra or additional final movement toward the rear of the universal bar 101 whereby it is made to contact with parts 299ª of the gear segments and cause an extra forward movement of the same so as to permit without fail the return of the previously depressed stop arm into position in rear of its coöperating stop projection 290.

Attention has already been called to the fact that while the machine includes twelve acccumulating wheels it only includes nine columns of keys. It is apparent, therefore, that the accumulation of amounts sufficiently great to include either one or all of the three left hand accumulators is due to transfer movements or actions alone. The mechanism for transferring or carrying into these three left hand accumulating wheels is identical with the mechanism above described.

*Recording mechanism.* — 300 designates type carrying bars the lower ends of which are secured to the rear ends of the plates or arms 115 adjacent to the lower edges thereof. The upper end portions of the said type bars are adapted to be impelled or thrown rearwardly for the purpose of causing the type 301 thereon to strike or impinge upon a platen 302.

303 designates an arm secured to the left hand end of the main driving shaft 56 of the machine. To the upper end of this arm the main power springs 252 for returning the handle and the parts operated thereby to normal position are secured, the rear ends of such springs being connected with a double hook member 305 supported at the upper rear end portion of the side plate 5. 306 designates a downwardly depending arm which is secured upon the outer left hand end of a short shaft 307 which is supported upon the plates 5 and 268ᵇ and 268ᶜ in bearings therein. The rear end of a bar 308 is pivotally connected to the lower end of the arm 306 while the forward end of the same is connected to the lower end of the depending arm of a non-print bell crank lever 309 which is pivoted at 310 upon the side plate 5 of the machine. The forwardly extending arm of the bell crank lever 309 is provided with a downward extension 311 having a curvilinear slot 312 therein with which is engaged a stud 313 upon the lower end of a non-print key 314 having a notch 315 therein which is adapted to engage the top plate 46 of the machine so that when the said non-print key has been depressed to prevent printing movement of the type bars it is held in such position as long as may be desired. Normally the said key 314 is held in elevated position by means of the coiled spring 316 with the stud 313 in the upper end of the slot 312. With the key 314 in the position shown in Fig. 4 of the drawings it is apparent that the depending arm of the bell crank lever 309 may be moved toward the front.

320 and 321 designate bars each of which is pivoted at its front end at 322 to the lower rear edge portion of the arm 303, such pivotal point being very nearly directly in rear of the shaft 56. The rear end of the bar 320 is provided with a slot 323 with which is engaged a screw-threaded headed stud 324 projecting from near the lower end of the arm 306. Normally the said stud is situated in the forward end of the slot 323 as is shown in Fig. 4 of the drawings. The rear end of the bar 321 is also provided with a slot 330 with which is engaged a stud 331 situated near the upper end of the upwardly extending arm of a bell crank lever 332 which is pivoted at 333 upon the side plate 5. The upper end of the upwardly extending arm of the bell crank lever 332 is provided with a straight portion 335 which is adapted to be engaged by the hooked end of a holding pawl 336 pivoted at 337 upon the side plate 5. The holding pawl 336 is provided with a projection 338 by means of which pivotal movement thereof is adapted to be occasioned to release it from engagement with the upper end, at 335, of the bell crank lever 332. Normally the stud 331 occupies the position in the slot 330 shown in Fig. 4 of the drawings. The holding pawl 336 is connected with the arm 306 by means of a yielding spring 340. The line of the said spring if extended would pass below the pivot 337 of the said holding pawl so that the tendency of the said spring is to turn the said pawl in a direction to cause it to engage the upper end of the upwardly extending arm of the bell crank lever 332.

In the operation of the machine when the operating handle 51 is pulled forward to cause forward rotation of the shaft 56 the arm 303 is also rotated so as to draw the bars 320 and 321 forwardly. Such forward movement of the bar 320 does not, however, disengage the stud 324 from the forward end of the slot 323 in the bar 320 by reason of the fact that the spring 340 is permitted to contract so as to cause a simultaneous forward movement of the arm 306. Such forward movement of the arm 306 also causes a forward movement of the bar 308 thereby causing pivotal movement of the bell crank lever 309. Such pivotal movement of the bell crank lever causes an upward movement of the forwardly extending arm thereof until the stud 313 upon the key 314 occupies a position at the lower end of the slot 312. As the bar 321 moves forwardly the rear end portion thereof slides upon the stud 331, the latter remaining stationary until just at the moment that the handle bar and the main driving shaft 56 with which it is connected reach the limit of their forward movement. Simultaneously or substantially simultaneously with this occurrence a block or projection 345 secured to the inner or right hand side of the bar 320 contacts with the releasing projection 338 of the holding pawl 336 to cause pivotal movement of the latter to disengage the hooked end thereof from the upper end of the upright portion of the bell crank lever 332. Immediately upon such release the bell crank lever 332 is shifted under the influence of the spring 350 the lower end of which is connected with the arm 351 extending forwardly from a shaft 352 said shaft being supported in bearings at the lower rear ends of the two intermediate plates 268$^b$ and 268$^c$. 353 designates an arm secured at the left hand end of the shaft 352 just outside of the side plate 5. Said arm extends forwardly and is slotted as indicated at 354 to receive a stud 355 upon the rear end of the rearwardly extending arm of the bell crank lever 332. The upper end of the spring 350 is connected with a projection 358 which extends forwardly beyond the pivotal connection at 360 between the angular member 361 and the rearwardly and horizontally extending arm of a bell crank lever 362 which is rigidly connected with a rotatable shaft 363 which is journaled in bearings in the intermediate parallel upright plates 268$^b$ and 268$^c$. The said bell crank lever 362 is situated inside of and adjacent to the upright plate 268$^b$. The lower end of the angular member 361 is pivotally connected to an arm 365 which extends upwardly and slightly rearwardly from the shaft 307, being rigidly secured to the latter and being situated upon the outside of and adjacent to the intermediate upright plate 268$^b$. It will be seen, therefore, that immediately upon the release of the upright arm of the lever 332 the latter is caused to rotate through a predetermined distance by the spring 350 acting through the arms 351 and 353. The distance through which the lever 332 is permitted to rotate may be adjusted and controlled by means of an adjustable eccentric stop 370. When the upwardly extending arm of the bell crank lever 332 snaps forward the stud 331 thereon is carried again to the forward end of the slot 330 in the link or arm 321 so that as the arm 303 is returned to normal position after having been operated the said arm acts against the stud 331 to return the upper end of the upwardly extending arm of the bell crank lever 332 into engagement with the holding pawl 336. Simultaneously also the bar or link 320 acts to return the arm 306 and parts connected therewith to normal position shown in Fig. 4.

For the purpose of adjusting the arm 306 upon the shaft 307 and with relation to the parts with which it coöperates I have provided a fixed arm 371 having a laterally extended projection 372 through which an adjusting screw 373 is extended and which engages with the rear edge of the arm 306. By adjustment of the said screw it is obvious that the arm 306 is also adjusted.

375 designates a bell crank lever secured to the right hand end portion of the rotatable shaft 363 adjacent to and inside of the intermediate plate 368°. 376 designates a bail rod secured to and supported upon the upper ends of the said bell crank levers 362 and 375 which bail rod extends through arcuate slots 377 in the type bar actuating plates 378, which are pivoted upon the shaft 363.

It will be noted that there are as many type bar actuating plates 378 as there are type bars 300; also that there are as many type bars as there are accumulating wheels. There are, in fact, in the construction shown, twelve accumulating wheels, twelve type bars and twelve type bar actuating plates. The upwardly extending portions of the bell crank levers 362 and 375 with the rod 376 constitute a bail which normally occupies the position shown in Fig. 6 with the bail rod 376 situated in the forward ends of the arcuate slots 377 in the type bar actuating plates 378. Upon the forward movement of the arm 306, as heretofore described, the shaft 307 would rotate to cause rearward movement of the arm 365 secured thereto. Such rearward movement through the angular connecting member 361 occasions pivotal movement of the bell crank lever 362 to cause rearward rotatory movement of the shaft 363, the upwardly extending arms of the bell crank levers 362 and 375 being simultaneously moved toward the rear so as to carry the bail rod 376 from the position shown in Fig. 6 to the rear ends of the said slots 377.

Normally the type bar actuating plates are held in the position shown in Fig. 6 by means of laterally extending stop projections 380 upon stop pawls 381 pivoted upon the rod 382 extending transversely between the two intermediate upright plates 268ᵇ and 268°. Coiled springs 383, one end of each of which is connected to a transverse bar 384 supported at its opposite ends upon the intermediate upright plates 268ᵇ and 268°, and the other end of each of which is connected to a type bar actuating plate 378, tend to cause pivotal movement of the said plates toward the rear of the machine. Such tendency, however, is resisted and pivotal movements of the said plates prevented normally by the projections 380 and the bail rod 376 which is in engagement with the forward ends of the arcuate slots 377. If the bail rod be moved to the rear and if the lateral stop projections 380 should then be released from underneath shoulders 385 upon the rear ends of the type bar actuating plates 378 (there is a shoulder 385 on each plate and a separate stop projection 380 for co-acting with such shoulder) the springs 383 cause sudden rearward pivotal movement of said plates 378. In order, therefore, to release predetermined type bar actuating plates to permit the desired type bars to be impelled rearwardly to contact with or impinge upon the platen, or upon a ribbon interposed between the type bars and the platen, I have provided means for actuating such of the said stopping pawls 381 as it may be desired to release at or about the time that the bail rod 376 reaches the rear ends of the slots 377. For this purpose I have provided arms 387 which extend rearwardly from the shaft 352 and are rigid therewith, said arms being situated inside of the lower end portions of the intermediate plate 268ᵇ and 268°, and being connected at their outer ends by means of a rod 388 upon which is pivoted a number of tripping members 389 which are provided at their upper ends with lateral projections 389ᵃ which are adapted, upon the occurrence of certain conditions, to engage shoulders 390 upon the holding pawls 381 to cause pivotal movement of the latter in opposition to springs 391 which tend to hold the lateral stopping projections 380 of the holding pawls in forward position to engage the shoulders 385 upon the rear ends of the type bar actuating plates 378. The springs 391 are connected at their rear ends to a plate 392 secured upon a bar 393 supported between the upright plates 268ᵇ and 268°. The forward edge of said plate is notched as indicated at 394. The pivoted tripping members 389 extend through said notches 394 and are held and guided thereby. The tripping members 389 are respectively slotted to provide arms 400 which extend forwardly and upwardly and are at their upper ends provided with rollers 401 which engage the edges of the rear ends of the arms or plates 115 of the sector units. The advantage of supporting the rollers 401 upon arms 400 is that the latter may be adjusted so as to adjust the pawl tripping members 389 with respect to the parts with which they coöperate. While the rollers 401 are in contact with the upper edge portions 402 of the rear ends of the arms or plates 115 the members 389 are held rearwardly so that the lateral projections 389 thereof will not contact with the shoulders 390 even though said members might be depressed. However, upon an upward movement of the rear end portions of the said plates 115 the rollers 401 fall into depressions 403 formed in the rear edges thereof to permit the said tripping members 389 which are associated with the plates or arms 115 which are rotated to move forward under the influence of the springs 404 so that the projections 389 thereof are carried into position over the shoulder 390. After the said members 389 have been moved into such position any downward movement thereof causes pivotal movement of the holding pawls 381 to remove the stop projections 380 thereof out of engagement with the shoulders 385 of the type bar actuating plates 378. The shaft 352 cannot be rotated until the pawl 336 is released from the upper end of the upright arm of the bell crank lever 332 which occurs at the end of the forward movement of the operating handle. Immediately such pawl 336 is released the spring 350 operates to quickly rotate the shaft 352 to carry the arms 387 downwardly thereby causing a corresponding downward movement of the members 389. All of those members 389 whose rollers 401 are in contact with the rear edge of a sector arm 115 which is associated with a column in which a key has been depressed so as to permit pivotal movement of the said arm 115 are moved into position by their springs 404 to bring the stops 389ª at the upper ends thereof over the shoulders 390 upon the holding pawls 381. The downward movement thereof causes disengagement of the stops 385 upon the said pawls from the corresponding type bar actuating plates 378 to permit the springs having connection therewith to cause a sudden movement of the said type bar actuating plates to propel the associated type bars rearwardly against the platen.

The type bars are respectively provided with slots 405 extending longitudinally thereof in rear of and parallel with the faces of the type thereon. 406 designates arms or pitman rods which respectively are provided with laterally extending projections 407 at their rear ends which extend into and through the slots 405 and are slidably engaged therewith. The forward end portions of the said arms are extended downwardly and are pivotally connected with the type bar actuating plates 378. The laterally extending projections 407 extend through horizontal open ended slots 408 in parallel disposed and relatively closely related type bar guiding plates 410. These guiding plates are held rigidly in fixed position with relation to each other upon parallel rods 411 and 412 supported upon the intermediate upright plates 268ᵇ and 268ᶜ. These type bar guiding plates 410 may be generally described as being of triangular shape with one of the angular portions, however of each of the same removed in order to provide a space extending transversely of the machine in which the platen and other mechanism are situated. At the lower angles of the said plates 410 notches 415 of the shape shown in Fig. 6 are provided. The portions of the said plates in rear of the said notches fit slots or notches 416 formed upon the rear side of the rod 411. The upper forward portions of the notches 415 are shaped so as to fit the engaging portion of the said rod 411. Notches 420 are provided in the respective plates directly above the notches 415. The upper forward edges of these notches are straight, as indicated, and the portions of the said plates above and in front of the said notches engage slots 421 formed in the forward side of the rod 412. The rear lower portions of the said notches 420 are shaped so as to fit closely against the contacting portions of the rod 412. The plates 410 are separated from each other upon the rods 411 and 412 by means of spacing ridges 422. The plates are clamped between the rods and held in position therebetween by means of screws 424 which bind the said rods together. It will be apparent, therefore, that the type bars being situated in the spaces between the guiding plates 410 the latter serve to guide the said type bars and prevent lateral displacement thereof. It is also apparent that the type bar driving connections 406 are guided in their movements by reason of the engagement of lateral projections 407 with the slots 408.

Upon reference to Fig. 2 of the drawings it will be observed that the type bar driving connections 406 are situated upon the right hand side of the respective type bars with which they are associated and that the lateral projections 407 thereof extend beyond the type bar with which it is directly associated into the slot of the adjacent type bar guiding plate 410 situated immediately to the left.

If a key in any column be depressed without depressing keys in the columns to the right thereof it is necessary not only that the digit number upon the key which has been depressed shall be recorded or printed but also that the type bars to the right of the type bar corresponding to the column in which the key was depressed shall be released and permitted to impinge upon the platen in order that the proper number shall be recorded. To accomplish this purpose I have provided projections 430 upon the pawls 381 which projections extend laterally toward the right of the machine and the projection upon one pawl overlaps the next pawl to the right so that should a pawl be released to permit the printing of a digit in the thousands column each pawl to the right thereof will also be released in order to permit the type bars corresponding to the hundreds, tens and units columns to be released and actuated to impinge upon the platen as described.

In the normal operation of the machine when accumulating and recording simultaneously the key 314 occupies the position shown in Fig. 4 of the drawings. In case, however, it shall be desired to operate the machine for the purpose of accumulating the amounts of the items of the accumulating wheels without at the same time recording the items upon a suitable strip provided for that purpose, as will be hereinafter described, the key 314 should be depressed and retained in depressed position by the engagement of the notch 315 with the top plate 46 of the machine. When in such position the stud 313 will occupy a position in the lower end of the slot 312 in the bell crank lever 309 so as to prevent pivotal movement of the latter. This will prevent longitudinal movement of the bar 308 which connects the lower end of the downwardly depending arm of the bell crank lever 309 with the lower end of the arm 306. The latter arm, therefore, will be held stationary so that as the bar 320 is moved forward as a result of the pivotal movement of the arm 303 rigidly connected with the main operating and driving shaft 56 it will not be lifted sufficiently to cause the block 345 secured thereon to contact with the projection 338 of the swinging pawl 336. Consequently the said pawl 336 is not disengaged from the upper end of the upright arm of the bell crank lever 332 so that the spring 350 is prevented from causing pivotal movement of the shaft 352 to actuate the various parts connected therewith; also by reason of the fact that the arm 306 is held against forward movement during the forward movement of the operating handle the shaft 307 remains stationary with the result that the parts having connection therewith and operated thereby remain in stationary position. It is apparent, therefore, that when the non-print key 314 is in depressed position the printing mechanism of the device is prevented from operating.

*Ribbon mechanism.*—440 designates the ribbon which is supported upon the ribbon spools 441 and 442 which are loosely mounted upon the opposite ends of a tubular rod 443 which is supported in openings 444 at the upper ends of the two intermediate upright plates 268$^b$ and 268$^c$. The ribbon spools 441 and 442 are situated outside of the said plates 268$^b$ and 268$^c$.

445 designates a shaft which extends through the tubular shaft 443 and is slidably connected therewith by means of a pin 446 which extends into the said tubular shaft 443 and into an elongated longitudinally extending slot 447 in the said shaft 445. Driving pawls 448 are rigidly or fixedly secured to the outer ends of the shaft 445 and are adapted to engage outwardly and laterally extending projections 449 upon the outer plates of the spools 441 and 442. It is apparent, therefore, that either of the said pawls may be moved into position to engage the stops 449 which are situated adjacent to it. In such case, however, the pawl at the opposite end of the shaft is not in position to engage adjacent stops. If the shaft 445 be so adjusted that neither of the driving pawls 448 is in position to engage the projections 449 upon the outside plate of either ribbon spool the driving of the said shafts 443 and 445 will not cause movement of said ribbon spools.

If the hollow shaft 443 be driven the shaft 445 also will be driven by reason of the pin and slot connection 446 and 447; should these be driven and should the pawl 448 be in position to engage a stop 449 upon an adjacent ribbon spool the latter would also be driven to wind the ribbon thereon and cause the unwinding of the same from the other ribbon spool. For the purpose of driving the shaft 443 I have provided a ratchet wheel 450 which is engaged by a driving pawl 451 which is pivoted at 452 upon the bell crank lever 375. A spring 453 having connection at one end to the said driving pawl 451 and at its other end to a stud 454 upon the bell crank lever 375 holds the engaging end of the said pawl in contact with the ratchet wheel 450. The oscillatory movements of the bell crank lever 375 occasion short reciprocatory movements of the driving pawl 451. As the said pawl is moved downwardly it slides over the teeth of the ratchet wheel 450 and as it is lifted upwardly engages an adjacent tooth of the wheel and causes rotation thereof. The said ratchet wheel being secured to the hollow shaft 443 causes a corresponding movement of rotation of the latter. In order to prevent reverse movement of the ratchet wheel 450 and of the shafts 443 and 445 I have provided a holding dog 455 which is pivotally supported upon the plate 268$^c$. One end of the said dog is weighted and holds the other end thereof in engagement with the said ratchet. It is apparent, therefore, that the ribbon spools are rotated step by step and consequently feed the ribbon step by step from one spool to the other.

The ribbon is turned and guided by means of ribbon guides 460 said guides being supported upon the intermediate plates 268$^b$ and 268$^c$ and having forwardly extending portions 461 which terminate upon the outsides of and adjacent to the inner plates of the spools so as to hold the spools against lateral displacement.

The portion of the ribbon 440 between the guiding and turning members 460 occupies a position adjacent to and parallel with the platen 302. Said ribbon also extends through the spaces or notches 462 formed by cutting out upper rear portions of the type bar guiding plates 410.

It will be understood that so long as one of the driving pawls 448 is in engagement with the projections 449 upon the same spool the spools will be rotated in the same direction and that when the longitudinal shaft 445 is shifted so as to carry the other pawl into engagement with the stops or projections upon the other spool the direction of rotation of said spools will be reversed.

*Paper feeding mechanism.*—In order that the items, etc. may be recorded it is necessary that paper or some impression receiving material should be provided upon the platen for receiving the imprints of the type bars, etc.

470 designates a roll of paper supported upon brackets 471 at the rear of the machine which brackets are provided with a guide roller 472 over and upon which the strip of paper passes and rests as it extends to the platen. The paper extends around the forward side of the platen, as shown in Fig. 6, and is guided and held in proper position with respect thereto by means of the edges 473 of the plates 410 which are situated underneath and adjacent to the platen; also by the guiding and holding fingers 474 which are situated at intervals longitudinally of the platen.

475 designates rollers which are adapted to be pressed by a spring 476 against the paper upon the platen. 478 designates a serrated plate the serrated edge of which is situated above the rear portion of the platen and adapted to be used for severing or tearing portions of the paper after it has been printed upon from the printing sheet or web. The rollers 475 coöperate with the rotatable platen for feeding the paper.

The rotation of the platen step by step is effected by means of an actuating pawl 480 which is pivotally supported upon the bent arm 481 which in turn is pivotally supported upon the platen shaft 482 adjacent to the right hand end of the platen. One end of the said pawl 480 is held in engagement with a ratchet 483 secured to the platen shaft 482 by means of a coiled spring 484. The forward downwardly depending end of the arm 481 is connected by means of a link 486 to the rearwardly extending arm of the bell crank lever 375. Oscillatory movement of the said lever 375 occasions reciprocatory movement of the link 486 which by reason of its connection with the arm 481 causes swinging oscillatory movement thereof. The pawl 480 being carried upon the said arm and being in engagement with the ratchet 483 causes a slight movement of rotation thereof and of the platen at each oscillatory movement of the bell crank lever 375. In order to prevent reverse movement of the platen I have provided a holding dog 490 pivotally supported upon the rod 491 connecting the upper ends of the plates 268$^b$ and 268$^c$, said dog being provided with a hook-like projection 492 which engages the said ratchet wheel 483. By reason of the coöperation of the platen 302 and the rollers 475, the paper being situated between the same, said paper is fed past the platen with a step by step movement.

Figure 7:
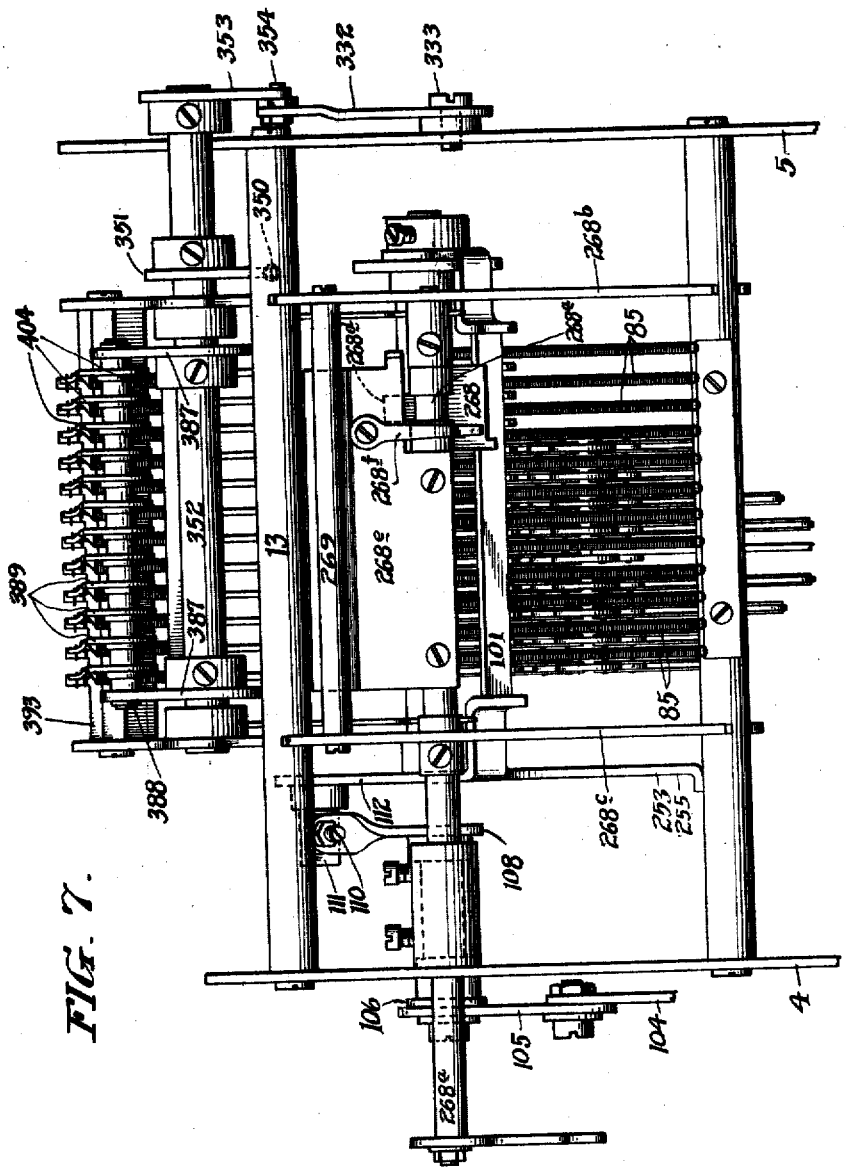
Fig. 7 is a bottom plan view of a portion of the mechanism located at the rear of the machine.

It will be observed that the two side plates 268$^b$ and 268$^c$, together with the transverse bars or rods 12 and 13 and other connections between the plates 268$^b$ and 268$^c$, constitute a removable frame structure upon which the actuators for the accumulator wheels, the universal bar 101 and the printing mechanism comprising the type bars, ribbon, etc. are mounted. The connection between the universal bar 101 and the driving cam 64 comprises the parts 109 to 112 inclusive. By reason of the fact that the part 111 is situated intermediate the opposing ends of the adjusting screws 110 and is readily removable from such position merely by sliding it rearwardly, it is apparent that the printing section, comprising the ribbon mechanism, type bars, actuators for the accumulator wheels, the universal bar 101, etc., may be readily removed as a whole and separated from the other portion or portions of the machine. In effecting such separation and removal, it would be necessary to remove the screws which are best shown perhaps in Fig. 7 of the drawings which retain the transverse bars or rods 12 and 13 between the side plates 4 and 5 of the machine.

*Mechanism for indicating when an item is added.*—In order to distinguish the items which are printed on the paper in the manner hereinbefore described from totals and sub-totals, the taking and printing of which will be hereinafter described, I have provided mechanism comprising a bar 500 which is rigidly or fixedly secured to an elongated stud 501 extending laterally and inwardly from an arm 502 which is rigidly secured upon a rock shaft 249 journaled in bearings in the outside plate 63 and the intermediate plate 268$^c$. Said arm 502 extends rearwardly from the said rock shaft 249. The outer end of said rock shaft is provided with a bell crank lever 248 as heretofore described. 503 designates a link the rear end of which is connected to the downwardly and somewhat forwardly extending arm of the bell crank lever 248 while the forward end thereof is pivotally connected with the oscillatable lever 174.

It will be apparent, therefore, that upon a rearward movement of the lever 174 the rock shaft 249 is rocked toward the left so as to cause movement of the bar 500 toward the front of the machine away from the platen 302. Such forward movement of the said bar 500 takes place during the time that the roller 173 upon the lower end of the lever 174 is passing or traveling between the points $a$ and $b$ of the cam slot 172 in the cam lever 170. Upon a movement of the oscillatable lever 174 toward the front of the machine, which takes place upon a downward movement of the rear end portion of the cam actuating lever 170 during the time that the roller is passing from $b$ to $a$ in the cam slot 172, the rock shaft 249 is rocked toward the rear so as to throw the bar 500 toward the rear and cause the same to contact with the ribbon at its upper rear end and print a symbol or character upon the paper at the right hand side of an item number printed thereon by means of type upon a type bar or bars. The symbol to be printed is provided at the point 508 upon the said bar. The said bar is provided with a rearwardly extending projection 509 which is situated adjacent to the outermost plate upon the right hand side of the group of type bar guiding plates 410. Such rearward extension serves to assist in guiding the bar 500 in its oscillatory movement. The said bar is also provided with a forwardly extending projection 510 at its upper end which has a lateral lug 511 at its forward end which is adapted to engage a stop projection 512 upon the bell crank lever 375 when the non-print key 314 is depressed to prevent operation of the printing mechanism. Such lateral lug or projection 511 contacts with the said stop projection 512 which remains stationary when the non-print key has been depressed so that the indicating symbol or character at the rear upper end of the bar 500 is prevented from contacting with the platen or rather the ribbon.

*Multiplying and dividing mechanism.—* I have provided means for facilitating and accelerating the operations of multiplying and dividing. Such mechanism comprises means for effecting a lateral movement of the shiftable or laterally movable accumulator frame, the accumulators carried thereby and the locking mechanism associated with the said accumulators.

520 designates an arm pivoted to the upper end of a rotatable shaft 521 which is mounted in a bearing 522 in the top plate 523. 524 designates a locking or catch plate having an elongated slot 525 at its rear end through which extends a short headed screw-threaded member 526 which is secured to the arm 520. Said catch or locking member 524 is in slidable engagement with the said screw-threaded member 526. The forward end of the catch or locking member 524 is slotted as indicated at 530 such slot being formed by slitting the forward end portion of the said member 524 and turning up the portion thereof between the slits so as to provide a finger-piece 531. The forward end portions of the member 524, upon opposite sides of the slot, extend underneath shoulders formed in the up-turned forward end 532 of the arm 520. The locking member 524 normally is held in its rearmost position, as shown in Fig. 2 of the drawings by means of a spring 533. The said catch or locking member 524 is provided with a lateral extension 534 having a downward projection 535 which is adapted to engage the sector shaped rack 538 which is secured upon the top plate 523. The lower end of the shaft 521 is provided with a rearwardly extending arm 540 having an adjustable eccentric stud 541 at the rear end thereof. Loosely mounted upon the said shaft 521 directly underneath the plate 523 is a forwardly extending arm 542 the forward end of which is provided with a depending projection 543 which is adapted to extend into the slot 203 upon the laterally extending portion 205 having connection with the arm 204 which constitutes a part of the accumulator carrying frame. Normally, as has heretofore been described, the accumulator carrying frame is held against lateral movement when in depressed position by reason of the engagement of the rearwardly extending projection 256 with the notches of the comb plate 257. If, however, the accumulator frame is free to be moved laterally as when it is in elevated or partially elevated position any lateral swinging movement of the forwardly extending arm 542 would cause a corresponding lateral swinging movement of the said accumulator frame.

543$^a$ designates a projection extending downwardly from the arm 542 the lower end of which is situated between the forward ends of the levers 544 and 545 which are loosely mounted upon the shaft 521. The rear ends of these levers 544 ad 545 are situated upon opposite sides of the eccentric adjustable stud 541. These levers 544 and 545 may be described as right and left levers, that is to say, the forward end of the lever 545 is upon the left hand side of the projection 543$^a$ and its rear end is upon the right hand side of the eccentric adjustable stud 541 while the forward end of the lever 544 is upon the right hand side of the projection 543$^a$ and its rear end is upon the left hand side of the stud 541. The rear ends of the said levers 544 and 545 are connected with each other by means of a coiled spring 546 as shown.

If the accumulator frame be in elevated position, and, therefore, laterally movable, it will be understood that by moving the arm 520 laterally. as, for instance, toward the right, having reference to Fig. 2, the arm 542 is correspondingly moved to cause a corresponding movement of the accumulator frame. In other words, when the accumulator frame is free to move it moves simultaneously with and in the same direction as the arm 520 is moved. Assuming, however, that the arm 520 is shifted to the right or left at a time when the accumulator frame is in depressed position, and, therefore, as heretofore described, held against lateral movement, the rearwardly extending arm 540 is also shifted but the arm 542 remains stationary. The adjustable eccentric stud 541 being situated between the rear ends of the levers 544 and 545 causes at such time a pivotal movement of one of said levers 544 or 545 depending upon the direction in which the said arm 540 is shifted. The arm 540 is, of course, shifted in a direction opposite to that in which the arm 520 is shifted. Such movement of one of the said levers 544 or 545, the other remaining stationary, places the spring 546 under considerable tension so that as soon as mechanism is operated to elevate the accumulator frame the said spring contracts so as to cause pivotal movement of the said lever 544 or 545 which has been held stationary to bring the said levers into normal relation with respect to each other. Such movement causes a quick movement of the arm 542 to shift the said accumulator frame to the right or left according as the arm 520 may have been shifted to the right or left.

In Fig. 2 the arm 520 is shown in normal position with the projection from the slidable member 524 in engagement with the notch of the sector at the extreme left hand edge thereof. In this position the accumulators are in position for the ordinary adding or accumulating operation. If, however, the arm be shifted so that the projection from the slidable catch member 524 is in engagement with the next adjacent notch toward the right, that is to say, the notch corresponding to the tens accumulator wheel, it will be seen that the latter will be shifted to the place normally occupied by the units accumulator so that the accumulations in the accumulators will be increased ten times, that is to say, will be multiplied by 10.

Assuming that it is desired to multiply the number 95 by the number 85, the keys 9 and 5 in the tens and unit columns respectively are depressed while the repeat key is also depressed. Thereafter the machine is operated five times which adds 95 together five times, giving the result as though it were multiplied by 5. Thereafter the arm 520 is shifted to the right so as to carry the projection from the slidable catch member 524 into the tens notch of the sector shaped member 538. The machine is then operated eight times which will show the resulting product 8075, which is the product obtained by multiplying 95 by 85. It will be seen, therefore, that the process of multiplication is greatly simplified and accelerated. The same is true of the process of division when use is made of the multiplying and dividing device just described.

When the accumulators have been shifted so that they occupy a position to the right of their normal position and so that the gears of certain accumulators do not engage the gear segments, it is necessary to provide means to take the place of the gear segments to prevent accidental rotation of the accumulators at such times as they would ordinarily be held against rotation by the said gear segments. For this purpose I have provided a plate 550 having notches in its upper edge forming projections 551. These projections are adapted to engage between the gear teeth of the gears 162 which are situated to the right hand side of the accumulators' actuating mechanism when the accumulators are in depressed position.

*Totaling and sub-totaling mechanism.*—It is frequently necessary to print the sum of items accumulated in the accumulators upon the recording strip of the machine; also it is frequently desirable that after such total has been recorded the number so recorded shall be returned into the accumulators and the subsequent accumulations of items therein added to the total as indicated upon the recording strip.

The sum recorded by the last operation is usually referred to as a sub-total while that recorded by the first operation by which the machine is cleared is referred to as a total.

The total key 560 is pivoted upon the plate 63 at the right hand side of the machine and is provided with a depending projection 561 the lower end of which is guided between a relatively short plate 562 and the said plate 63 such guiding being desirable to prevent, accidental or otherwise, lateral deflection or movement of the depending projection 561. The lower end of the projection 561 is provided with a lug 564 which is adapted to be engaged by a shoulder 565 upon the lower edge of the rear end of a lever 566 pivoted at 567 upon the said plate 63. The forward end of the said lever is situated underneath a pin 570 projecting from the key-release key stem 140, so that upon depression of the latter the rear end of the said lever 566 is adapted to be elevated to release the shoulder 565 from the stop 564 in case the two are in engagement, as is shown in Fig. 28, in which the total key 560 is in depressed position. Normally the total key is in the position shown in Fig. 3 of the drawings. Upon depression of the same it turns about its pivot, the projection 561 thereof moving toward the front of the machine. Such movement is in opposition to the spring 571 which normally holds the said projection in its rearward position with the upper end of the key in its forward position. By releasing the shoulder of the catch lever 566 from the stop 564 the spring 571 is permitted to cause rearward movement of the lower end portion of the said total key. Upon depression of the total key 560 a projecting pin 575 thereon contacts with the rearwardly extending projection 576 upon the swinging arm 179 so as to cause rearward swinging movement of the said arm in opposition to the spring 183. Such movement carries the lower end of the said arm into a position out of the path of movement of the angular cam member 176.

578 designates a link having connection at 579 with the total key 560 at a point below its point of pivotal connection to the plate 63. The said link 578 extends forwardly and is provided with a stud or projection 580 which extends laterally and inwardly from its front end and which engages at its inner end in a slot 581 in the upper end portion of a projection 582 extending upwardly from the release lever 144 from a point thereon in front of its point of pivotal connection to the side plate 4 of the machine. Said link is also provided relatively near its front end with a pin 582ª which projects through a slot 583 in the forward end of a link 584 having pivotal connection at 585 to the swinging lever 283, the latter having connection also with the non-add key 280 as heretofore described. The total key 560 is also provided with a projection 586 which extends downwardly and forwardly being situated in front of the projection 561. The lower end of the projection 586 is provided with a roller 587, as shown, which, when the total key is in normal position, as shown in Fig. 3 of the drawings, contacts with a tripping arm 588 which is pivotally secured at 589 to the arm 62 and is held in normal elevated position by means of a spring 590, pivotal movement under the influence of said spring toward the left being limited by contact of a forwardly extending projection 591 upon the said arm with a pin upon the arm 62. When the operating handle is pulled forward the arm 62, together with the pivoted arm or lever 588, is carried toward the front of the machine and if the total key be in normal undepressed position the upper side of the said arm or lever 588 will contact with the roller 587 upon the lower end of the projection 586. If, however, the total key be depressed, as shown in Fig. 28, the roller 587 is carried out of the path of movement of the rear end of the said tripping arm or lever 588. It will also be noted that by reason of the depression of said total key lever 560 the swinging arm 179 has been moved so as to carry the lower end thereof out of the path of movement of the angular cam member 176 with the result that the cam lever 170 is not actuated upon the forward movement of the handle. Such depression of the total key also causes forward movement of the link 578 so that the forward end portion of the release lever 144 is depressed through the pin and slot connection 580 and 581. Such depression of the release lever 144 causes depression of the bail rod 153 causing a corresponding depression of the rearwardly extending arms of the bell crank levers 32 so as to permit upward movement of the stops 36 upon the stop arms 35 to permit rearward swinging movement of the stop pawls 37. The upwardly extending arms to the bell crank levers are moved rearwardly at the same time to effect release of all of the keys as described.

It will be apparent, therefore, that upon the depression of the total key 560 so as to swing the lower end of the arm 179 out of the path of movement of the angular cam 176 the cam lever 170 will not be actuated upon the forward movement of the operating handle. As described, the depression of the total key effects disengagement of the projections or lugs 33 from the projections 34 of the stop arms 35 so as to permit forward swinging movement of the arms 35, thereby positioning the stops 36 to permit rearward swinging movement of the stop pawls 37. It follows, therefore, that upon the forward movement of the operating handle all of the sector units which are associated with the accumulators in which numbers have been accumulated are permitted to rotate and being in engagement with the accumulator gears 162 cause rotation of the accumulators in a direction the reverse of that in which they are rotated during the operation of accumulating therein. The extent of such rotation depends upon the number which is visible or which has been accumulated in the accumulators. Such reverse rotation will continue until the tripping projections 165 contact with the shoulders 293 upon the arms 291. When the accumulators reach this position they are at zero position and the machine is in a position usually referred to as clear. As the sector units rotate causing a reverse rotation of the accumulators the type bars are elevated. The height to which they are respectively elevated depends upon the digit in the accumulator corresponding to the particular type bar. For instance, the type bar associated with the accumulator in which the 9 appears is elevated to a higher position than a type bar in which a 5 or a 3 is shown or is present in the accumulator.

When the total lever is depressed, as in taking a total or a sub-total, and the operating handle is operated for the purpose of taking such total or sub-total as above described, the type bars move through a slightly greater distance than during the ordinary accumulating operation of the machine. It becomes necessary, therefore, in order that the total or sub-total, as it may become, shall be printed in the proper position upon the record strip, that some means be provided to compensate for such surplus movement of the type bars. To cause the printing of the total at the proper point upon the record strip I have provided means which when the total key is depressed causes a lifting movement of the platen. Such means consists of a link 595 having connection at its upper end to a rearward projection 596 from the total key 560. At its lower end the link 595 is connected to an arm 598 secured to the right hand end of the rock shaft 268ª. The platen 302 is supported upon the upper ends of two upright arms 600 the lower end portions of which are extended forwardly as indicated at 600ª. These forwardly extending portions are provided upon their underneath edges adjacent to their ends with notches 600ᵇ which engage the rock shaft 268ª. The bottoms of said notches are seated in notches 600ᶜ formed in the upper side of the said rock shaft 268ª. Semi-cylindrical clips 600ᵈ are adjustably secured by means of a pin and slot connection 600ᵉ to the underneath side of the rock shaft 268ª. The opposite edges of these clips are situated intermediate the said rock shaft and the edges of the said notches. It will be apparent, therefore, that upon a depression of the total key 560 the rock shaft 268ª will be rocked forwardly so as to cause upward movement of the rear edges of the said clips which contact with the bottoms of the notches 600ᵇ and effects an upward or lifting movement of the said arms 600. By adjusting the clips 600ᵈ so as to vary the positions of the rear edges thereof with respect to the bottoms of the notches 600ᵇ and thereby vary the time at which the said edges contact with the bottom of such notches the distance through which the arms and the platen carried thereby may be elevated is varied. The movement of elevation of the platen thus effected compensates for the surplus vertical movement of the type bars when a total is taken.

If it were possible to take a total immediately after a transfer movement or operation a character one lower than that shown upon the accumulator which has been actuated by the transfer operation would be printed; consequently, a safety device has been provided to compel an idle handle stroke or spacing stroke, as it is called, after the carrying operation before the printing of a total or a sub-total. In the carrying operation the gear segment 116 rotates toward the rear of the machine through a single space, that is to say, a distance sufficient to rotate its associated accumulator through one step or one space so as to go from a zero to a 1, from a 1 to a 2, from a 2 to a 3, etc. As a result of such movement the projection 601 upon the lower rear edge of the segment is moved downwardly into position to be engaged by the rear edge of the plate 268ᵉ which is secured to the shaft 268ª so that rocking of the said shaft through the link 595 upon the depression of the total key is prevented; consequently no total or sub-total can be taken until after a spacing stroke of the operating handle has been taken.

I have also provided means to prevent depression of the total key except when the accumulator gears 162 are in engagement with the gear segments 116. The means provided for this purpose consists of an upright arm 605 pivoted adjacent to the lower edge of the plate 63 and the upper end of which is adapted to be carried forward underneath the shoulder 606 formed upon the outer end of the projection 596. When permitted the spring 571 draws the said upright arm 605 forwardly to carry its upper end underneath the shoulder 606. The arm 605 is provided at its upper end with a rearwardly extending projection 607 terminating in a shoulder 608 which is in engagement with the rear side of the stud 194 upon the arm 195 as heretofore described. Upward forward movement of the said stud permits a forward movement of the upright arm 605 so that its upper end may pass underneath the shoulder 606.

It is apparent that a total should not be taken during the time that the accumulator carrying frame is displaced laterally, as when the operation of multiplication is being performed. Hence I have provided means to prevent depression of the total key at such time, such means consisting of a spring-pressed bar 610 having a pin and slot connection with a plate 611 secured at the right hand side of the machine, as shown. When the accumulator carrying frame and the locking frame associated therewith are in normal position the said locking bar 610 is held in retracted position by reason of the contact of the inner side of the arm 215 with the lateral projection 612 upon the inner end of the said bar. When the accumulator carrying frame and the locking frame are shifted to the right a spring 613 having engagement at its right hand end with a stud 614 upon the stationary plate 611 and at its other end with a stud 615 projecting from the bar 610 causes longitudinal movement of the said bar toward the right so as to carry the outer right hand end thereof underneath the rearwardly extending projection 616 at the upper end of the link 595 and thereby prevents depression of the total key.

I have also provided means to prevent operation of the operating handle while the total key is in a partially depressed position. The means for this purpose consists of a lug or block 620 secured upon the inner side of the link 595 which, when the total key 560 is partially depressed, is adapted to contact with the forward end of an elongated stop member 621 upon the link 622 which extends between the arm 62 and the lower end of an arm 623 having connection at its upper end to a rock shaft 624. It is apparent that if the block 620 is moved downwardly into alinement with the forward end of the elongated stop 621 forward movement of the link 622 is prevented, thereby preventing forward pivotal movement of the arm 62 and the main operating shafts 56. After the operating handle starts on its return movement and after the accumulator carrying frame has moved downwardly into normal position the total key is prevented from being depressed by reason of the fact that the block or stud 620 is situated above the top edge of the elongated stop 621. The forward end of said stop is normally situated below and just in rear of the stop 620.

To take a total the total lever 560 is depressed. Thereafter the operating handle is pulled toward the front. Immediately after the said handle starts on its movement toward the front a lug 630 upon the inner side of the arm 62 passes from underneath a projection 631 on the underneath edge of the lever 566 to permit the rear end of the latter to drop down so as to carry the shoulder 565 into engagement with the stud 564 to hold the total lever in depressed position.

Depression of the total lever moves the swinging arm 179 into position to prevent contact of the angular cam 175 with the roller 178 at the lower end of the said lever. Consequently the cam lever 170 is not actuated upon the forward movement of the operating handle. The total lever having been depressed the roller 587 is moved forwardly so that the tripping arm or lever 588 is permitted to swing up into position to engage the roller 632 upon the cam lever 170 as the operating handle and parts associated therewith are returning to normal position. Such engagement of the tripping arm or lever 588 with the roller 632 causes upward movement of the rear end of the cam lever 170 upon the return of the operating handle so that the movements of the parts actuated by the cams in the forward end of the said lever and in the arm 235 secured thereto are exactly the reverse of what they are in the normal accumulating operations of the machine; that is to say, the cam lever is moved upwardly during the return movement of the operating handle instead of downwardly, said cam lever remaining stationary during the forward movement of the operating handle.

It will be understood that in taking a total the accumulators are rotated in a direction the reverse of that in which they are rotated during the normal accumulating operation of the machine. The reverse movement of the accumulators is checked or limited by the contact of the tripping projections 165 with the shoulder 293 upon the transfer levers 291. When the projections 165 are seated against or in proximity to the shoulders 293 the accumulators are in zero position.

In case it should be desired to return the sums of the items accumulated in the accumulators back into the accumulators the key-release key 140 should be depressed. The pin 570 thereon contacts with the forward end of the lever 566 so as to disengage the shoulder 565 from the lug or projection 564 upon the lower end of the projection 561. Such release will permit the total key 560 to spring into normal position, but this cannot happen immediately because (although normally the stop 621 travels forwardly underneath the stop 620 upon the link 595) when the total key is depressed the stop 620 is carried down so that the stop bar 621 travels forwardly above the said stop 620. The result, therefore, is that notwithstanding the fact that the shoulder 565 is disengaged from the stud 564 upon the lower end of the projection 561 the said total lever is not permitted to return to normal position until after the stop 621 has been pulled forward a sufficient distance to permit the stop 620 to pass up in rear of the same. Upon this occurrence the roller 586 springs forward and strikes the swinging end of the lever 588 and depresses the same so that it does not contact with the roller 632 upon the cam lever 170 as the operating handle and parts carried upon the main driving shaft 56 return toward the rear of the machine. The result is that the said cam lever 170 is not actuated so that the gear segments 116 remain in engagement with the accumulator gears 160 and rotate the same so as to return the total into the accumulators.

To the inner end of the rock shaft 624 a rearwardly extending arm 640 is secured. The rear end of said arm is connected to a piston rod 641 having connection with a piston (not shown) within the chamber 642 of the governor. Although not described in detail the governor is provided with adjustable means for controlling the transfer of a fluid, such as air, from one side to the other of the piston in the governor chamber to thereby control the speed of movement of said piston and consequently that of the other parts of the machine connected directly or indirectly thereto.

The words "accumulator" and "accumulating wheels" are employed herein as words or terms of description and not of limitation and are intended to include and comprehend other kinds of accumulators than the wheels shown.

I claim:

1. In a computing machine, the combination of keys, means associated with said keys for holding the same in depressed position after they have been depressed, swinging devices for supporting the said means, means for causing swinging movement of the said swinging devices, a lever having connection with the last mentioned means for causing movement thereof, said lever having an arm thereon free to swing in one direction and held against swinging movement in the opposite direction, a driving shaft, and means carried thereby for engaging the said arm to cause movement of the said lever to thereby effect release of said keys.

2. In a computing machine, the combination of accumulators, actuating means therefor, swinging arms carrying stop devices, connections between the said swinging arms and the said actuating means, yielding means for causing movement of said swinging arms, movable stops normally in the path of movement of the stop devices on said swinging arms, depressible keys, means intermediate the said keys and the said movable stops whereby depression of a key permits movement of a stop out of the path of movement of the corresponding stop on a swinging arm, and stops normally out of the path of movement of the stop on said swinging arm one of which stops is moved by the depression of said key into the path of movement of said stop on said swinging arm.

3. In a computing machine, the combination of accumulators, actuating means therefor, swinging arms carrying stop devices, connections between the said arms and the said actuating means, a driving shaft, yielding connections between the said driving shaft and the said swinging arms, pivoted arms having stops thereon normally in the path of movement of the stops on said swinging arms, said pivoted arms having forwardly extending projections, keys, stops having connection with the respective keys, said stops being normally out of the path of movement of the stops on said swinging arms, and being moved into such path upon the depression of the keys, means associated with the keys for holding the same in depressed position, swinging arms for supporting the said last mentioned means, one series of said swinging arms having rearwardly extending projections the rear ends of which contact with the projections upon said pivoted arms, movable means in engagement with or in proximity to the said rearwardly extending arms, a lever pivoted intermediate its ends and having connection at one end with the said movable means and having an arm upon its opposite end free to swing in one direction but held against swinging in the opposite direction, means upon the said driving shaft for actuating the last mentioned swinging arm to cause movement of the said pivoted lever to release the said keys, and means for moving the last mentioned arm out of the path of movement of the means carried by said driving shaft whereby actuation of the said lever is prevented to thereby prevent release of the said keys.

4. In a computing machine, the combination of a row of keys, a longitudinally movable locking bar having means adapted to engage said keys to lock the same against vertical movement, a bell crank lever one arm of which is operatively connected to said locking bar, a link having connection at one end to the other of said arms, a driving shaft having means carried thereby for engaging with the said link when in normal position to hold the same depressed and thereby holding the said locking bar in unlocked position, and means for causing the said locking bar to move into locking position during the first part of the forward movement of said driving shaft.

5. In a computing machine, the combination of a plurality of rows of keys, a plurality of locking bars, one bar associated with each row of keys and each bar having means adapted to engage the said keys to lock the same against operation and the said bars being supported to move longitudinally, swinging arms having connection with one end of each of the said locking bars, a link having connection at one end with the said swinging arms and at its lower end having a laterally extending projection, a driving shaft, a plate secured to the said driving shaft and adapted to contact with the said projection to move the said link into lowermost position when the said driving shaft is in normal position to hold the said bars in normally unlocked position, and means for causing forward movement of the said bars to lock the said keys at the beginning of the operation of the said driving shaft.

6. In a computing machine, the combination of a series of rows of keys, a series of links associated respectively with the said rows of keys said links having devices which are adapted to engage the said keys to hold the same in depressed position after a depression, bell crank levers at the front of the machine having upright arms upon which the forward ends of said links are supported and also having rearwardly extending arms, pivoted upright arms for supporting the rear ends of said links, a bail member adapted to contact with the rearwardly extending arms for causing movement of the said bell crank levers, a lever pivoted intermediate its ends and having operative connection with the said bail member, a driving shaft having a plate thereon provided with means for actuating the said lever to cause release of the said keys, locking bars for locking the said keys to prevent movement thereof after the said driving shaft has started upon an operating movement, said bars having connection at their rear ends with swinging arms rigidly secured upon a transverse bar, said shaft having an arm angularly related to the locking bar supporting arms, a link depending from the said arm said link having a lateral projection adapted to be engaged by the said plate just before the said driving shaft reaches the end of its return movement whereby the said arms to which the locking bars are connected are moved so as to disengage the same from the said keys.

7. In a computing machine, the combination of accumulating wheels, means for actuating the same, swinging arms, pivots for supporting said arms, connections between the said swinging arms and the said actuating means, a driving shaft, and springs having connection at their rear ends with the underneath side of the said driving shaft and at their forward ends with the said arms, the forward end portions of said springs extending above and partially around the said pivots.

8. In a computing machine, the combination of accumulators, means for actuating the same, said means having projections extending therefrom, swinging arms, connections between said swinging arms and said projections, a driving shaft, yielding connections between said driving shaft and said swinging arms, a cam member on said driving shaft, a universal bar normally in engagement with one edge of each of the said projections, means intermediate the said cam and the said universal bar whereby forward movement of the said driving shaft and of the cam carried thereby occasions movement of the universal bar away from the said projections whereby the said yielding connections between the said driving shaft and the said arms are permitted to occasion a predetermined amount of movement of predetermined projections.

9. In a computing machine, the combination of accumulators, means for actuating the same, said means having projections extending therefrom, a driving shaft, yielding connections between the said driving shaft and said projections, a cam member on said driving shaft, a universal bar normally in engagement with one edge of each of the said projections, means intermediate of the said cam and the said universal bar whereby forward movement of the said driving shaft and of the cam carried thereby occasions movement of the universal bar away from the said projections whereby the said yielding connections between the said driving shaft and the said projections are permitted to occasion a predetermined amount of movement of predetermined projections.

10. In a computing machine, the combination of accumulators, means for actuating the same, said means having projections extending radially therefrom, a universal bar supported normally in contact with the rear lower edges of said projections, swinging arms, connections between the said swinging arms and the said projections, a driving shaft, yielding connections between the said swinging arms and the said driving shaft, a cam rigidly connected with the said driving shaft, means intermediate the said cam and the said universal bar for causing rearward movement of the latter to permit rearward movement of predetermined projections upon the forward rotatory movement of the said driving shaft, and means for returning the said driving shaft to normal position and thereby effecting return of said universal bar to normal position.

11. In a computing machine, the combination of accumulators, means for actuating the same, said means having projections extending radially therefrom, a universal bar supported normally in contact with the rear lower edges of said projections, a driving shaft, yielding connections between the said driving shaft and said projections, a cam rigidly connected with the said driving shaft, means intermediate the said cam and the said universal bar for causing rearward movement of the latter to permit rearward swinging movement of the said projections, and means for returning the said driving shaft to normal position and thereby effecting return of said universal bar to normal position.

12. In a computing machine, the combination of accumulators, means for actuating the same, said means having projections extending radially therefrom, a universal bar contacting with the said projections to hold the said actuating means in normal position, swinging arms each having a pivoted pawl, connections between the said swinging arms and the said projections, movable stops normally in the path of movement of said pivoted pawls, keys, key actuating stops normally out of the path of movement of the said pivoted pawls but adapted to be moved into the path of movement of the same upon the depression of a key, mechanism intermediate the keys and the said movable stops whereby upon the depression of a key the said movable stop coöperating therewith is permitted to swing out of the path of movement of the pawl on a coöperating swinging arm, a driving shaft, yielding means connecting said driving shaft to said swinging arm, a cam rigidly secured to said driving shaft, and connections between the said cam and the said universal bar whereby upon the forward rotary movement of said driving shaft said universal bar is caused to move away from the said projections to permit the latter to move through a distance corresponding to the key actuating stop which was moved into alinement with the pawl upon the depression of a key or keys, the extent of movement of the remaining projections being determined by the distance normally existing between the pawls upon the said swinging arms and the said movable stops.

13. In a computing machine, the combination of accumulators, actuating means therefor, said means having projections extending radially therefrom, a universal bar contacting with the said projections and adapted to return and hold them in normal position, a driving shaft, a cam secured to said shaft, and an adjustable connection between said cam and said universal bar for actuating the latter upon movement of said cam, said adjustable connection comprising two oscillatable members having adjustable connection with each other.

14. In a computing machine, the combination of accumulators, means for actuating the same, said means having projections extending therefrom, a universal bar normally in contact with the said projections for holding the latter in normal position, swinging means for supporting the said universal bar, a driving shaft, an operating handle for rotating the same forwardly, power means for returning the said shaft and operating handle to normal position, connections between the said driving shaft and the said projections whereby upon forward movement of the said operating handle the said projections are adapted to move rearwardly, and connections between the said driving shaft and the said swinging means for supporting the said universal bar for actuating the latter, the said connections including adjusting devices whereby the normal position of the said universal bar may be adjusted with relation to the said projections, the said adjusting devices comprising two oscillatable members having adjustable connection with each other.

15. In a computing machine, the combination of accumulators, actuating means therefor, said means having projections extending radially therefrom, a universal bar normally in contact with the said projections to hold the same in normal position, swinging arms for supporting the said universal bar, a driving shaft, an operating handle for causing rotation of said driving shaft in one direction, power means for returning the said driving shaft and said operating handle to normal position, connections between the said driving shaft and the said projections whereby when the said shaft is operated by the said handle the said projections are adapted to be moved in one direction, a cam secured to said driving shaft, a lever pivoted intermediate its ends and having one end in engagement with the said cam, a connection between the other end of said lever and an arm of a rock shaft, the said rock shaft, which rock shaft has a second arm projecting therefrom, an arm having connection with the arms for supporting the universal bar and an adjustable connection between the said arm and the second arm described as projecting from the said rock shaft.

16. In a computing machine, the combination of accumulating wheels, actuating means therefor, oscillatable means for supporting said wheels, locking means for holding the said wheels against rotation when disconnected from their actuating means, a cam lever provided with a plurality of cams, means for actuating the said cam lever, an arm in engagement with one of said cams, said arm having yielding connection with the said oscillatable wheel supporting means, a second pivoted arm having a part thereon in engagement with the other cam of said cam lever and yielding means for connecting the said pivoted arm to the said wheel locking means whereby pivotal movement of the said pivoted arm causes oscillatory movement of the said wheel locking means, the said cams operating to hold said locking means in position to lock the said wheels when the latter are removed from the wheel actuating means.

17. In a computing machine, the combination of accumulating wheels, gears rigidly connected with the said wheels, actuating means including gear segments for engaging said gears to cause rotation thereof, oscillatable means for supporting said wheels, oscillatable locking means for locking the said wheels against rotation when the said gears are separated from the said gear segments, swinging arms, parts extending from the said wheel supporting means and the said locking means and being in contact respectively with portions of said swinging arms, springs for holding the said swinging arms, springs for holding the said parts in contact with the said arms whereby upon movement of said arms the said parts are moved positively in one direction and yieldingly in the opposite direction, a cam lever having cams for actuating said arms said cams being so related to each other that they cause independent and simultaneous movements thereof, and means for actuating the said cam lever.

18. In a computing machine, the combination of an oscillatable accumulating wheel supporting means, an oscillatable locking means for holding said wheels against accidental rotation, a pivoted arm extending downwardly from its pivotal point and having a projection extending beyond its pivotal point, means for connecting the said oscillatable wheel supporting means with said projection, a pivoted arm extending upwardly from its pivot, means for connecting its upper end with the said oscillatable locking means, a cam lever having a cam in engagement with the depending end of the first named lever and also having a cam in engagement with the second named pivoted lever at a point intermediate its pivot and the upper end thereof, the said cams operating to hold the said locking means in locking engagement with the said wheels when they are in elevated position and during the periods that they are moving to and from elevated position.

19. In a computing machine, the combination of accumulating wheels, an oscillatable wheel supporting means, oscillatable locking means for locking the said wheels against accidental rotation, a cam lever having cam slots therein, a connection between one of the said cams and the said oscillatable wheel supporting means, and a connection between the other of said cams and the said oscillatable locking means the said cams being shaped and arranged with relation to each other so as to positively and rigidly hold the said locking means in locking relation to the said accumulating wheels when they are in elevated position and also during the period in which they are moving to and from elevated position.

20. In a computing machine, the combination of accumulating wheels, oscillatable means for supporting said wheels and for moving the same laterally, means for causing oscillation of said wheel supporting means, an oscillatable locking frame carrying locking means for holding the accumulating wheels against accidental rotation, the said locking frame having projections extending laterally thereof, an oscillatable rod having slidable connection with the said projections, and means for causing oscillation of the said rod to thereby cause oscillation of the said locking means to effect engagement and disengagement thereof with the said accumulating wheels.

21. In a computing machine, the combination of accumulating means, means for actuating the said accumulating means, means for oscillating the said accumulating means, oscillatable locking means for holding the said accumulating means against accidental movement, means for causing oscillation of the said locking means to move the same into and out of locking relation with respect to the said accumulating means, and means for shifting the said accumulating and locking means laterally with respect to the said machine.

22. In a computing machine, the combination of laterally shiftable accumulators, means for normally holding the said accumulators against lateral shifting movement, a pivoted arm having operative connection with said accumulators, pivoted crossed levers, the ends of which upon one side of their pivot have operative connection with said arm, a spring connecting the opposite ends of said crossed levers and means for causing pivotal movement of either of said levers to place the said spring under tension whereby upon release of the said holding means movement of the said arm is caused to effect lateral shifting movement of the said accumulators.

23. In a computing machine, the combination of laterally shiftable accumulating means, mechanism for actuating the said accumulating means which mechanism normally is in engagement with the said accumulating means, means for holding the said accumulating means against shifting movement when in normal position in engagement with the said actuating mechanism, a shaft, a forwardly extending arm rigidly connected with the said shaft said arm being adapted to be adjusted to different positions, a second arm rigidly secured to the said shaft, a shifting arm having pivotal connection with the said shaft and having operative connection with the said laterally shiftable accumulating means, right and left levers pivotally mounted upon the said shaft intermediate the said shifting arm and the said second named arm and having their front ends situated on opposite sides of their front ends situated on opposite sides of their rear ends upon opposite sides of a part having connection with the said second named arm, and a spring connecting the said rear ends, said spring being adapted to be placed under tension when the said second named arm is moved in either direction if the said shifting lever is held against lateral movement whereby when the said accumulating means is moved out of engagement with the said actuating mechanism it is automatically shifted laterally.

24. In a computing machine, the combination of accumulating wheels, actuating means therefor, oscillatable supporting means for said wheels, means for oscillating the said supporting means into and out of engagement with the said wheel actuating means, slidable means for supporting the said wheel supporting means, means for holding the said wheel supporting means against sliding movement when the wheels are in engagement with the said actuating means, a pivoted arm having operative connection with the said wheel supporting means, a spring having operative connection with the said arm and means for placing the said spring under tension whereby when the said wheel supporting means is released it may be automatically shifted in either direction.

25. In a computing machine, the combination of accumulating wheels, actuating means therefor, said wheels being normally in operative engagement with the said actuating means, an oscillatable support for the said wheels, means for causing oscillation of the said support to move the same into and out of operative engagement with the said actuating means, means for shiftably supporting the said wheel supporting means, an arm having operative connection with the said wheel supporting means, a spring having operative connection with the said arm, an operating arm for placing the said spring under tension, means for holding the said operating arm in any position to which it may be adjusted, whereby the said spring may be held under tension ready to act automatically to shift the said wheel supporting means laterally upon the release of the same.

26. In a computing and recording machine, the combination of accumulating wheels, rotatable means for actuating said wheels, vertically arranged type bars having connection at their lower end with the said rotatable actuating means, said type bars being normally in their lowermost position, a platen, pivoted type bar actuating plates having connection respectively at their upper edges above their pivots with the type bars, said type bars being slidably related to the said actuating plates, springs tending to cause actuating movement of said actuating plates, notches in the rear edges of said plates, spring pressed pivoted pawls in engagement with the said notches to hold the same in position against actuation under the influence of the said springs, and means for tripping predetermined pawls to permit printing movement of predetermined type bars.

27. In a computing and recording machine, the combination of accumulating wheels, rotatable actuating mechanism therefor, type bars having connection at their lower ends with parts of the said actuating mechanism in rear of the axis of the same, a platen, type bar actuating plates, means for slidably connecting the respective type bars with their respective actuating plates, springs tending to cause rearward movement of said actuating plates to cause the said type bars to strike the said platen, pawls normally in engagement with the said actuating plates to hold the same against operation, tripping arms having parts adapted to engage the said pawls to trip the same to permit movement of the said actuating plates, the parts upon said tripping arms which are adapted to engage the said pawls to trip the same being normally in rear of the same, means tending to move the said tripping arms toward the said pawls, and means for automatically permitting movement of the said tripping arms into position to trip the said pawls.

28. In a computing and recording machine, the combination of accumulating wheels, rotatable actuating mechanism for causing rotation of said wheels, type bars having connection at their lower ends to said rotatable mechanism in rear of the axis of rotation of said rotatable mechanism, whereby, when the said mechanism is rotated forwardly, the said type bars are elevated, a platen, pivoted type bar actuating plates, means for slidably connecting the said type bars with the said plates respectively, means tending to cause movement of the said actuating plates to effect impact of the said type bars against the said platen, pivoted locking pawls in engagement with the said plates to prevent operative movement thereof, tripping arms adapted to engage the said tripping pawls to disengage the same from the said type bar actuating plates, the tripping ends of said tripping arms being normally in rear of the said tripping pawls, means tending to move the said tripping arms into position to engage the said tripping pawls, means for permitting predetermined tripping arms to be moved forwardly into position to engage the said tripping pawls, and means for causing tripping movement of said tripping arms.

29. In a computing and recording machine, the combination of accumulating wheels, rotatable mechanism for actuating the same, means for rotating said rotatable mechanism, vertically arranged type bars secured at their lower ends to the rear portions of a part of said rotatable actuating mechanism, the said type bars being normally in their lowermost positions and being elevated upon forward rotative movement of the said actuating mechanism, a platen, type bar actuating members, slidable connections between the said members and said type bars, means tending to cause movement of the said members to drive the said type bars against the said platen, means holding the said members against such movement, devices for tripping predetermined ones of said holding means to permit actuation of predetermined type bars, and means common to the type bar actuating members for returning the same together with the type bars to normal position.

30. In a computing and recording machine, the combination of accumulating wheels, rotatable mechanism for actuating the same, means for effecting rotation of the said rotatable mechanism, vertically arranged type bars having connection at their lower ends with said rotatable mechanism at points in rear of their axes of rotation, the said type bars being normally in their lowermost position, a platen, type bar actuating members, slidable connections between the said members and the said type bars, means tending to cause movements of the said members to drive the said type bars against the said platen, holding means to prevent such movement of said members, means for releasing predetermined ones of said holding means, a swinging bail rod, adapted to engage the said members and to return them to and hold them in normal position, and means for causing swinging movement of said bail rod.

31. In a computing and recording machine, the combination of accumulating wheels, rotatable mechanism for actuating said wheels, means for causing rotation of said mechanism, vertically arranged type bars having connection at their lower ends with members of said rotatable actuating mechanism, the said type bars being normally in their lowermost position and being elevated by the forward rotatory movement of said actuating mechanism, and the said mechanism being provided at its rear edge with a cam surface, means for determining the extent of rotation of said actuating mechanism and thereby determining the height to which the said type bars are elevated, a platen, type bar actuating members, means for slidably connecting the said members with the said type bar, means tending to cause movement of said members to cause the said type bars to impinge upon the said platen, locking pawls for engaging said members to hold the same against movement, tripping arms for tripping said pawls, said tripping arms having adjustable projections normally in engagement with the said cam surfaces, the said arms being normally held thereby in position with the tripping parts thereof in rear of said tripping pawls, springs for moving the said tripping arms forwardly into opposite position upon forward rotation of the said actuating mechanism, and means for depressing said tripping arms.

32. In a computing and recording machine, the combination of accumulating wheels, rotatable actuating mechanism therefor, means for causing rotation of said mechanism, vertically arranged type bars having connection at their lower ends with parts of said actuating mechanism in rear of the axis of rotation thereof, the said type bars being normally in their lowermost position, and being adapted to be elevated upon the rotation of the said mechanism forwardly, a platen, type bar actuating members, means for slidably connecting the said type bars with the said members, means tending to cause movement of said members to drive said type bars against said platen, holding pawls for preventing such movement of said members, tripping arms having parts adapted to engage said pawls to trip the same, said arms having means normally in engagement with the rear edges of parts of the said wheel actuating mechanism for holding the said tripping arms out of operative relation to the said tripping pawls, the said tripping arms being adapted to move into operative relation upon the forward rotation of the said wheel actuating mechanism, a rock shaft having rearwardly extending arms to which the said tripping arms are connected, and means for causing movement of said rock shaft to effect a downward movement of said tripping arms after the movement of a type bar or bars into the elevated position desired.

33. In a computing and recording machine, the combination of accumulating wheels, rotatable mechanism for actuating the said wheels, a driving shaft, mechanism whereby rotation of the said driving shaft causes rotation of said wheel actuating mechanism, vertically arranged type bars having connection at their lower ends with said wheel actuating mechanism at points in rear of the axis of rotation of the latter, said type bars being normally in their lowermost position and being elevated as the said actuating mechanism are rotated forwardly, a platen, type bar actuating plates, means for slidably connecting the said type bars with said actuating plates, means tending to cause movement of said type bar actuating plates to drive the said type bars against the said platen, pawls in engagement with said type bar actuating plates to prevent movement thereof, means for releasing predetermined ones of said type bar actuating plates to permit actuating movement thereof, a universal bar for contacting with, returning and holding the said type bar actuating plates in normal position, and means controlled by the said driving shaft for actuating the said universal bar.

34. In a computing and recording machine, the combination of a driving shaft, means for operating said shaft, an arm secured upon said shaft, links having connection with said arm and extending rearwardly therefrom, a rock shaft having a depending arm having a pin and slot connection with one of said links, a bell crank lever having rearwardly and upwardly extending arms, the latter having a pin and slot connection with the other of said links, the pins in both cases being normally situated at the forward ends of the slots whereby when the said shaft is operated forwardly the said links are permitted to move forwardly relatively to said pins, a pivoted catch for engaging the upwardly projecting arm of said bell crank lever, a spring connected to said catch at a point out of alinement with its pivot and to the second above named arm and tending to hold said catch in engagement with the upright arm of said bell crank lever and also tending to cause forward movement of said second arm, an arm extending upwardly from said rock shaft, type bars, type bar actuating means, swinging arms supporting a bar common to said type bar actuating means, a connection between said upwardly extending arm on said rock shaft and said swinging arms whereby movement of said upwardly extending arm on said rock shaft during forward movement of said driving shaft causes movement of the bar carried on said swinging arms into position to permit movement of said type bar actuating means against actuating movement, tripping means for tripping said pawls, a rock shaft having arms for supporting said tripping means and also having an arm connected by a pin and slot connection with the rearwardly extending arm of said bell crank lever, a spring tending to lift said two last mentioned arms and means for releasing the said catch from said bell crank lever to permit the said last-mentioned spring to actuate the arms supporting the said tripping means.

35. In a computing and recording machine, the combination of a driving shaft, an operating handle having connection therewith, an arm rigidly secured to said shaft, links having direct connection with said arm and extending rearwardly therefrom, printing mechanism, ribbon feeding mechanism, means connected to said printing mechanism for operating the ribbon feeding mechanism, means operatively connected with said links and controlled thereby for controlling the operation of said printing mechanism, and means adapted to prevent actuation of the said link controlled means to thereby prevent operation of the said printing mechanism and also to prevent operation of said ribbon feeding mechanism.

36. In a computing and recording machine, the combination of a driving shaft, means for rotating the shaft forwardly, means for returning the said shaft to normal position, an arm secured upon said shaft, a link connected with said arm, a rock shaft having a depending arm, said depending arm having a pin and slot connection with said link, a second link having connection with said first named arm, a bell crank lever having upwardly and rearwardly extending arms, a pivoted catch normally in engagement with the upwardly extending arm of said bell crank lever for holding the same in its rearmost position, said upright arm having a pin and slot connection with the second named link, printing mechanism, connections between parts of said printing mechanism and the said rock shaft, a spring connecting the depending arm of said rock shaft and said catch and operating to move the said arm forwardly upon a forward movement of said driving shaft, a second spring tending to actuate other parts of the said printing mechanism, and means upon the first named link for releasing the said catch to permit the said second spring to become effective.

37. In a computing and recording machine, the combination of a driving shaft, means for rotating the shaft forwardly, means for returning the said shaft to normal position, an arm secured upon said shaft, a link connected with said arm, a rock shaft having a depending arm, said depending arm having a pin and slot connection with said link, a second link having connection with said first named arm, a bell crank lever having upwardly and rearwardly extending arms, a pivoted catch normally in engagement with the upwardly extending arm of said bell crank lever for holding the same in its rearmost position, said upright arm having a pin and slot connection with the second named link, printing mechanism, connections between parts of said printing mechanism and the said rock shaft, a spring connecting the depending arm of said rock shaft and said catch and operating to move the said arm forwardly upon a forward movement of said driving shaft, a second spring tending to actuate other parts of the said printing mechanism, means upon the first named link for releasing the said catch to permit the said second spring to become effective, a non-print key, and connections between the same and the said depending arm of said rock shaft whereby upon depression of said key the said arm is prevented from moving forwardly and whereby the said catch is prevented from being released to thereby prevent operation of the printing mechanism.

38. In a computing and recording machine, the combination of accumulating mechanism for adding items, a platen, type bars, means for relatively shifting the type bars and the said platen, type bar actuating means for causing the said type bars to impinge upon the said platen, means for effecting movement of certain of said type bar actuating means to cause the type bars connected therewith to impinge upon the platen, a swinging bail for returning the said type bar actuating means to normal position, means for impressing an indicating mark adjacent to the printed item, means for holding the printing mechanism out of operation, and means for preventing the said indicating mark impressing means from impinging upon the said platen upon holding the printing mechanism out of operation.

39. In a computing and recording machine, the combination of accumulating mechanism, means for printing the items as they are accumulated, an oscillating pivoted member carrying a symbol which is adapted to be impressed for printing an indicating device adjacent to each printed item to indicate the same, means for preventing operation of the mechanism for printing said items, and means having connection with a part of the said printing mechanism for limiting the movement of said oscillatable member in one direction to prevent the impressing of the said symbol.

40. In a computing and recording machine, the combination of a driving shaft, printing mechanism for printing items and totals, connections between the said printing mechanism and the said driving shaft whereby oscillation of the latter may cause the said printing mechanism to operate, an oscillatable cam lever, means actuated by said driving shaft for causing oscillation of the said cam lever, a device for printing indicating marks adjacent to printed items, and connections between the said device and the said cam lever whereby oscillations of the latter cause movements of the said device.

41. In a computing and recording machine, the combination of oscillatable accumulators for accumulating items, a driving shaft, a cam lever adapted to be oscillated by the operating movements of said driving shaft, connections between the said cam lever and the said accumulators whereby oscillatory movement of the latter is effected, printing mechanism for printing items and totals, means for connecting the said printing mechanism with the said driving shaft whereby operation of the former is caused by the operating movements of the latter, a device for printing indicating marks adjacent to the printed items for distinguishing the same from the printed totals, connections between the said device and the said cam lever whereby when the said cam lever is raised the said device is moved away from printing position and is moved toward such position when the said cam lever is moved in the opposite direction.

42. In a computing and recording machine, the combination of printing mechanism for printing items and totals, a driving shaft, connections between the said driving shaft and the said printing mechanism whereby actuation of the said driving shaft may effect printing operation of the said printing mechanism, an oscillatable cam lever, means carried by said driving shaft for effecting oscillatory movement of said cam lever, a device for printing indicating marks adjacent printed items to distinguish the same from printed totals, and connections between the said device and the said cam lever which operate when the said cam lever is moved upwardly to move the said device away from printing position, said connections operating when the said cam lever moves downwardly to cause printing movement of said device toward its printing position.

43. In a computing and recording machine, the combination of oscillatable accumulators, actuating means therefor, means for causing oscillation of said accumulators toward and from said actuating means, printing mechanism for printing items and totals, an element of said printing mechanism having connection with the said actuating means and being adapted to be adjusted thereby into desired relation with respect to another element of said printing mechanism, a device for printing an indicating mark adjacent to printed item numbers, and connections between the said device and the mechanism for oscillating the said accumulators, said mechanism being arranged so as to cause movement of the said device away from printing position as the accumulators are moved away from the actuating means therefor and toward printing position as the accumulators are moved toward the said actuating means therefor.

44. In a computing and recording machine, the combination of oscillatable accumulators, actuating means therefor, a swinging arm, connections between the said swinging arm and said accumulators whereby the swinging of said arm causes oscillatory movement of the said accumulators toward and from the actuating means therefor, means for causing swinging movement of said arm, printing mechanism including means whereby items and totals may be printed, a device for printing an indicating mark adjacent to item numbers, a rock shaft having an arm upon which said device is supported, said rock shaft having a second arm, a connection between the last mentioned arm and the said swinging arm whereby swinging movement of the latter rocks the said rock shaft and thereby actuates the said device.

45. In a computing and recording machine, the combination of printing mechanism including a platen, a total key, and means intermediate said key and said platen for raising the latter upon a depression of said key.

46. In a computing and recording machine, the combination of printing mechanism including a platen, a rock shaft having cams thereon, arms supported at their lower ends upon said rock shaft and having connections at their upper ends with said platen, a total key, and a connection between said total key and said rock shaft whereby the latter may be rocked upon a depression of said key to cause the cams on said shaft to shift said arm and thereby shift said platen.

47. In a computing and recording machine, the combination of printing mechanism including a platen, a rock shaft, arms having connection at their lower ends with said rock shaft and at their upper ends with said platen, a total key, a link connecting the said total key with said rock shaft whereby upon depression of said total key the said shaft is rocked to elevate said arms and effect elevation of said platen.

48. In a computing and recording machine, the combination of printing mechanism including a platen, a rock shaft, arms having connection at their upper ends with said platen and at their lower ends with said rock shaft, a total key, connections between said key and said shaft whereby actuation of said key effects rocking movement of said shaft and adjustable cam members on said shaft for engaging said arms to cause shifting movement thereof.

49. In a computing and recording machine, the combination of oscillatable accumulating wheels, means for actuating the same normally in engagement therewith, an oscillatable cam lever, connections between the said cam lever and the said wheels whereby upward movement of said lever causes movement of said wheels away from the actuating means therefor and whereby subsequent downward movement thereof causes movement of the said wheels into engagement with the said actuating means, a driving shaft, means actuated by said shaft for normally causing movement of the said cam lever upwardly upon the forward movement of the said driving shaft and downwardly during the return movement of said shaft, printing mechanism for printing items and totals, connections between the said printing mechanism and the said driving shaft whereby the said printing mechanism is operated upon the forward movement of said driving shaft, a device for printing an indicating mark adjacent to item numbers, connections between the said device and the said cam lever whereby upon upward movement of the said cam lever the said printing device is moved away from the printing point and toward the printing point as the said cam lever moves downwardly, and means adapted to prevent actuation of the said cam lever upwardly upon the forward movement of the said driving shaft and to cause upward movement thereof during the return movement of said driving shaft.

50. In a computing and recording machine, the combination of oscillatable accumulating wheels, means for actuating the same normally in engagement therewith, an oscillatable cam lever, connections between the said cam lever and the said wheels whereby upward movement of said lever causes movement of said wheels away from the actuating means therefor and whereby subsequent downward movement thereof causes movement of the said wheels into engagement with the said actuating means, a driving shaft, means actuated by said shaft for normally causing movement of the said cam lever upwardly upon the forward movement of said driving shaft and downwardly during the return movement of said shaft, printing mechanism for printing items and totals, connections between the said printing mechanism and the said driving shaft whereby the said printing mechanism is operated upon the forward movement of said driving shaft, a device for printing an indicating mark adjacent to item numbers, connections between the said device and the said cam lever whereby upon upward movement of the said cam lever the said printing device is moved away from the printing point and toward the printing point as the said cam lever moves downwardly, a total key, means actuated by said key when it is depressed to prevent upward movement of the said cam lever during a forward movement of the said driving shaft, and means having connection with the said driving shaft and which is permitted, when the said total lever is in depressed position, to engage the said cam lever and cause upward movement thereof during the return movement of the said driving shaft, said upward movement causing a movement of the said indicating marking device away from the printing point.

51. In a computing and recording machine, the combination of oscillatable accumulating wheels, an oscillatable cam lever, connections between said cam lever and said wheels whereby oscillation of the former causes oscillation of the latter, actuating means for said wheels, said actuating means being normally in operative engagement with said wheels, a driving shaft, means for rotating the said shaft forwardly, means for returning the same to normal position, connections between the said driving shaft and the said wheel actuating means for driving the same, actuating means carried by said shaft which normally causes upward movement of said cam lever upon a forward movement of said driving shaft and a downward movement thereof during a return movement of said shaft, a pivoted total lever having means adapted, when the said total lever is adjusted, for preventing upward movement of the said cam lever upon the forward movement of the said driving shaft, means for locking the said total lever in adjusted position, means whereby when the said total lever is held in adjusted position the said cam lever is moved upwardly during the return movement of said handle, and means for unlocking the said total lever whereby a part carried by said total lever is adapted to prevent the said means from causing upward movement of the said cam lever whereby the said cam lever remains stationary during a complete operation of the driving shaft and whereby after the said wheels have been rotated in reverse direction to zero position upon the forward movement of said shaft they are rotated forwardly upon the return movement of the said shaft to the position occupied thereby at the beginning of the operation.

52. In a computing machine, the combination of oscillatable accumulating wheels, actuating means therefor, the said wheels being normally in operative engagement with the said actuating means, an oscillatable cam lever, connections between the said cam lever and the said accumulating wheels whereby oscillations of the said lever causes oscillation of the said wheels, the said cam lever being normally in its lowermost position, a total lever, a pivoted stop adapted to engage the said total lever for preventing depression of the same, said stop having means in contact with a part of the connection between the said cam lever and the said wheels whereby normally it is held out of position to engage the said total lever, a driving shaft and means connected therewith for normally causing upward movement of said cam lever upon a forward movement of said shaft and downward movement thereof during the return movement of said shaft to normal position, means controlled by parts of said total key whereby when said key is in depressed position the said cam lever is prevented from being moved upwardly during the forward movement of said driving shaft but is caused to move upwardly during the return movement thereof whereby upon the completion of the return movement of said shaft the wheels are in elevated position, out of engagement with the actuating means therefor, whereby the said stop is permitted to move into engagement with said total key to prevent depression thereof.

53. In a computing and recording machine, the combination of accumulating mechanism, mechanism for printing items as they are accumulated, and also for printing the totals of said items when desired, a total key adapted to position mechanism so as to cause the printing of totals accumulated in the accumulating wheels, and means for preventing the taking and printing of totals successively without an intervening operation of the machine.

54. In a computing machine, the combination of laterally shiftable accumulators, means for shifting the same laterally, a spring pressed slidable bar normally held in retracted position by a part having connection with the said laterally shiftable accumulators, the said bar moving longitudinally upon a lateral shifting movement of said accumulators, a total key and a part having connection therewith which is adapted to engage a projecting portion of said bar when the said accumulating wheels have been shifted out of normal position.

55. In a computing machine, the combination of accumulators, actuating means therefor, said means having projections extending therefrom, a universal bar contacting with the said projections and adapted to return and hold them in normal position, a driving shaft, a cam secured to said shaft, and a connection between said cam and said universal bar for actuating the latter upon movement of said cam, said connection comprising two oscillatable members, one of which is provided with opposing adjustable contact points and the other having a part situated between said points.

56. In a computing machine, the combination of accumulators, actuating means for the said accumulators, a driving shaft, connections between the said driving shaft and certain of said actuating means, stops for preventing rearward movement of said connections and of the actuating means connected therewith, a stop for contacting with the said actuating means which have no connections with said driving shaft, a total key, means having connection therewith for releasing the first named stops to permit the same to move into inoperative positions, whereby said connections are free to move, and a connection between the said total key and the second mentioned stop for moving the same into position to prevent contact therewith of the actuating means normally adapted to contact therewith.

57. In a computing machine, the combination of accumulators, actuating means therefor said means having projections extending downwardly therefrom, a driving shaft, connections between the said driving shaft and certain of said projections, the remaining projections not being connected with said shaft, said connections carrying pivoted stop pawls, pivoted arms having stops which are normally in the path of movement of said pivoted stop pawls, a pivoted stop situated adjacent to the said remaining projections said remaining stop being normally in the path of movement of said projections, a total key, means actuated thereby upon depression thereof to permit swinging movement of said pivoted arms to move the stops thereon out of the path of movement of the said stop pawls, and means also actuated by said total key upon a depression of the same to move the said pivoted stop out of the path of movement of said remaining projections.

58. In a computing machine, the combination of accumulators, actuating means therefor, the said means respectively having projections extending therefrom, a driving shaft, connections between the said driving shaft and certain of the said projections, said connections respectively carrying pivoted stop pawls, pivoted arms having stops at their outer swinging ends situated normally in the path of movement of the said pivoted pawls, a total key, means operated by depression of said key for permitting swinging movement of said pivoted arms to carry the stops thereon out of the path of movement of said stop pawls to permit rearward movement of the said connections, a rock shaft, a plate yieldingly connected thereto and normally acting as a stop to limit the movement of the said projections not having connection with the said driving shaft, the said rock shaft having a laterally extending arm, and a connection between the said total key and the said arm whereby upon depression of the said key the said rock shaft is rocked to move the said stop plate out of the path of movement of the said projection.

59. In an adding machine, the combination of finger keys, swinging contact members, movable means for limiting the swinging movements of said swinging members connected to said finger keys, accumulator wheels, actuators therefor, connections between said actuators and said swinging members, swinging contact means for returning said accumulator wheel actuators to normal position, springs attached to said accumulator wheel actuators to actuate the same when said swinging contact means moves away from normal position, an oscillatable member, connections between said oscillatable member and said swinging contact means whereby oscillation of said oscillatable member causes swinging movement of said swinging contact means, and springs extending from said oscillatable member to said swinging contact members.

60. In an adding machine, the combination of accumulator wheels mounted in an oscillating sliding frame, actuators for said accumulator wheels, means for moving said accumulator wheels in and out of engagement with said actuators, means for engaging said accumulator wheels when out of engagement with said actuators, means for sliding said accumulator wheel frame laterally, consisting of an actuating lever, and a graduated positioning rack therefor, a stop for maintaining a normal relation between said actuating lever and said accumulator wheel sliding frame, and a yielding connection between said sliding frame and said actuating lever adapted to admit of a movement of said actuating lever in either direction independent of the sliding movement of said accumulator frame.

61. In an adding machine, the combination of accumulating wheels carried in an oscillating frame, actuators for said accumulating wheels, means for oscillating said frame comprising an oscillating arm having a movement in excess of the movement of said oscillating frame, a yielding connection between said oscillating arm and said oscillating frame, and an adjustable stop for limiting the movement of said oscillating frame in one direction.

62. In an adding machine the combination of a keyboard of depressible finger keys arranged in columns, swinging members for each column, means controlled by the finger keys of each column for limiting the swinging movements of the coöperating swinging members, accumulator wheels, actuators therefor, movable type connected to said actuators, a platen, spring driven actuators for driving said type against said platen, connections between said accumulator actuators and said swinging members, an oscillating operating means for swinging said swinging members until limited by the means controlled by the said finger keys, means for tripping said type actuators, means for restoring said spring driven type actuators to normal position during the return of said oscillating operating means to normal position, means for locking said spring driven type actuators in normal position and connections between the same and the said keyboard, and means for rendering said tripping means inoperative.

63. In an adding machine, the combination of accumulator wheels, actuators therefor, means for moving said accumulator wheels in and out of engaging relation with said actuators, means for engaging said accumulator wheels to hold the same against rotation at the point the same begin to be disengaged from said actuators, a swinging arm provided with two cam slots, and coöperative connections between said cam slots respectively and said means for moving said accumulator wheels in and out of engaging relation with said actuators and said means for engaging and holding said accumulating wheels against rotation.

64. In an adding machine, the combination of accumulator wheels mounted in an oscillating frame, actuating means therefor, means for moving said accumulator wheels in and out of engaging relation with said actuating means, said means consisting of a swinging member carrying two pawls, and having a cam, an oscillating operating member adapted to contact with said pawls, means for moving said pawls out of contact relation with said oscillating operating member, and coöperating connections between said cam and said oscillating frame carrying said accumulating wheels.

65. In a computing and recording machine, the combination of accumulating wheels, actuating means therefor, an oscillatable frame for supporting said accumulating wheels, an oscillatable member, a yielding connection between the said oscillatable member and the said oscillatable accumulating wheel support whereby oscillations of said oscillatable member cause oscillating movements of the said accumulator wheel support to engage and disengage the accumulator wheels from the said actuating means, a total key, a movable member intermediate said key and said yielding connection, and means whereby, when the said yielding connection is in position with the said accumulating wheels out of engagement with the said actuating means, the said movable member is in position to prevent operation of the said total key.

66. In a computing machine, the combination of accumulators, actuating means therefor, said means having projections extending therefrom, a universal bar contacting with the said projections and adapted to return and hold them in normal position, a removable frame in which said actuating means and universal bar are mounted, a driving shaft, a cam secured to said shaft, and a separable connection between said universal bar and said cam for the purpose specified.

In testimony that I claim the foregoing as my invention, I have hereunto signed my name this 15th day of Sept., A. D. 1915.

GLENN J. BARRETT.

In the presence of—
E. E. THAYER,
FRANK W. MOSHER.